May 30, 1933. W. J. PASINSKI 1,911,768
ACCOUNTING MACHINE
Filed Feb. 25, 1927 19 Sheets-Sheet 4
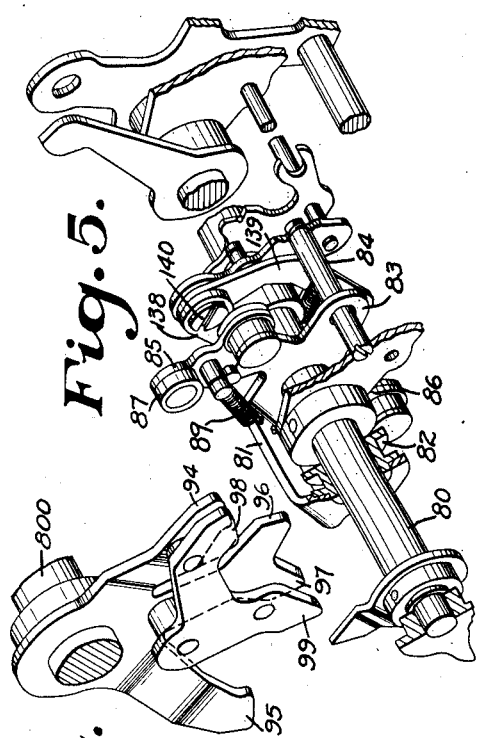
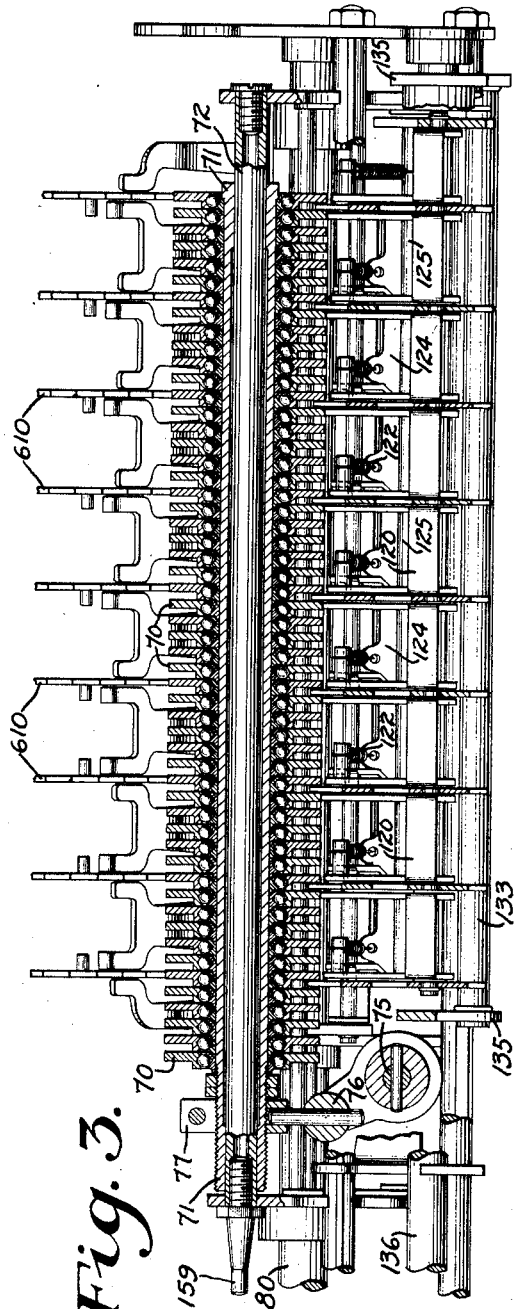
INVENTOR
Walter J. Pasinski
BY
Rector, Hibben, Davis, & Macauley
ATTORNEYS May 30, 1933.  W. J. PASINSKI  1,911,768
ACCOUNTING MACHINE
Filed Feb. 25, 1927  19 Sheets-Sheet 5

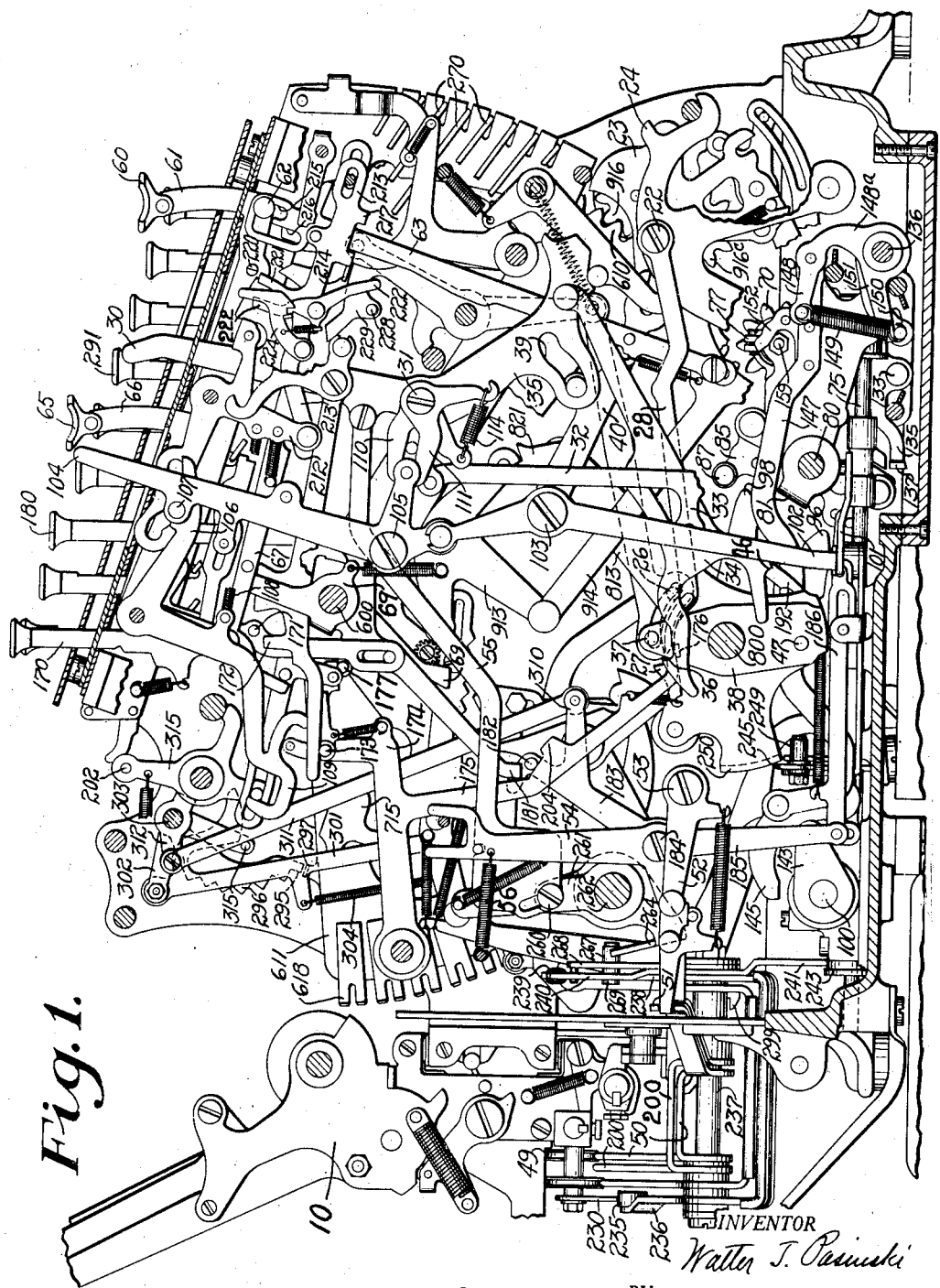

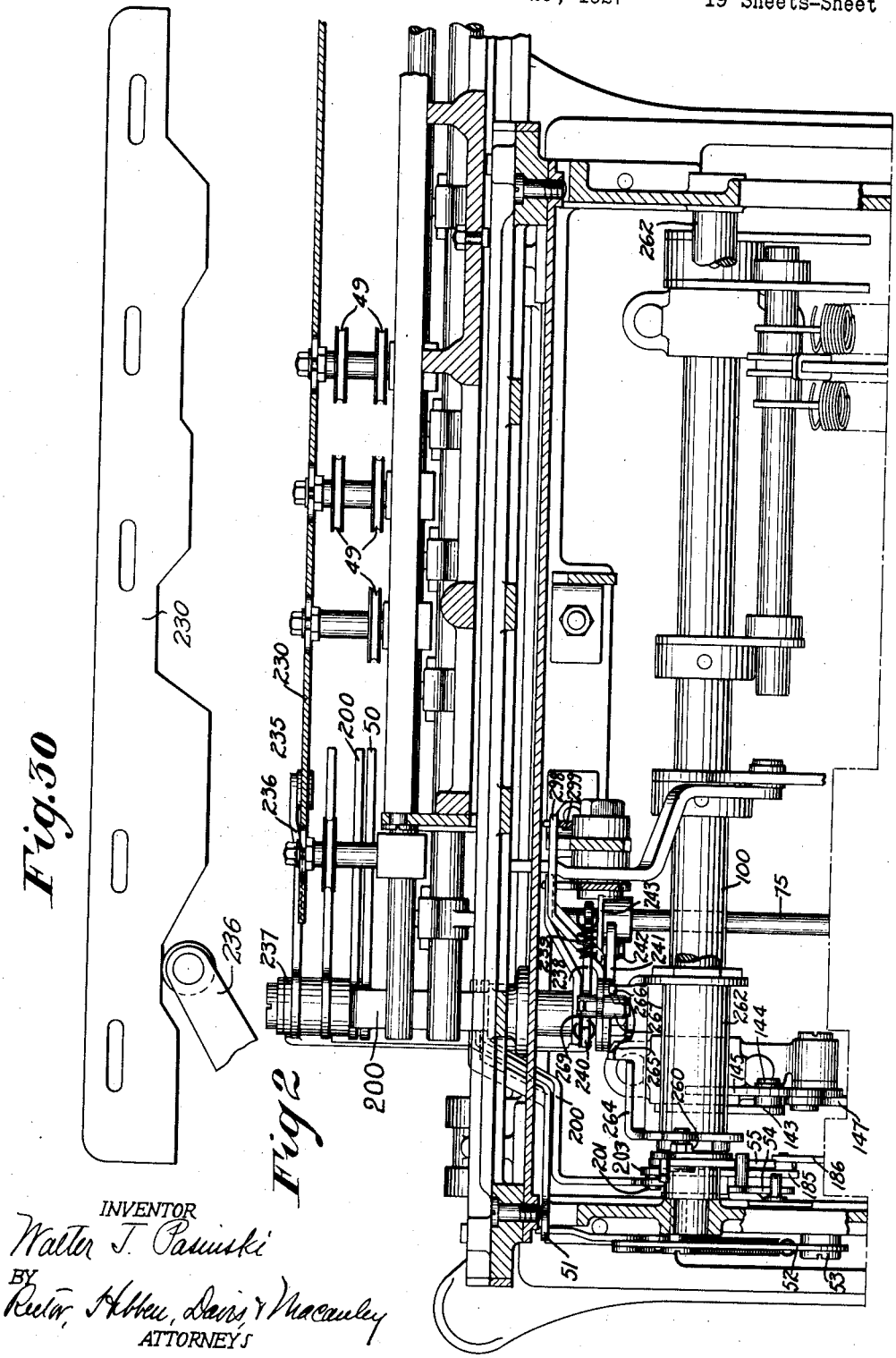

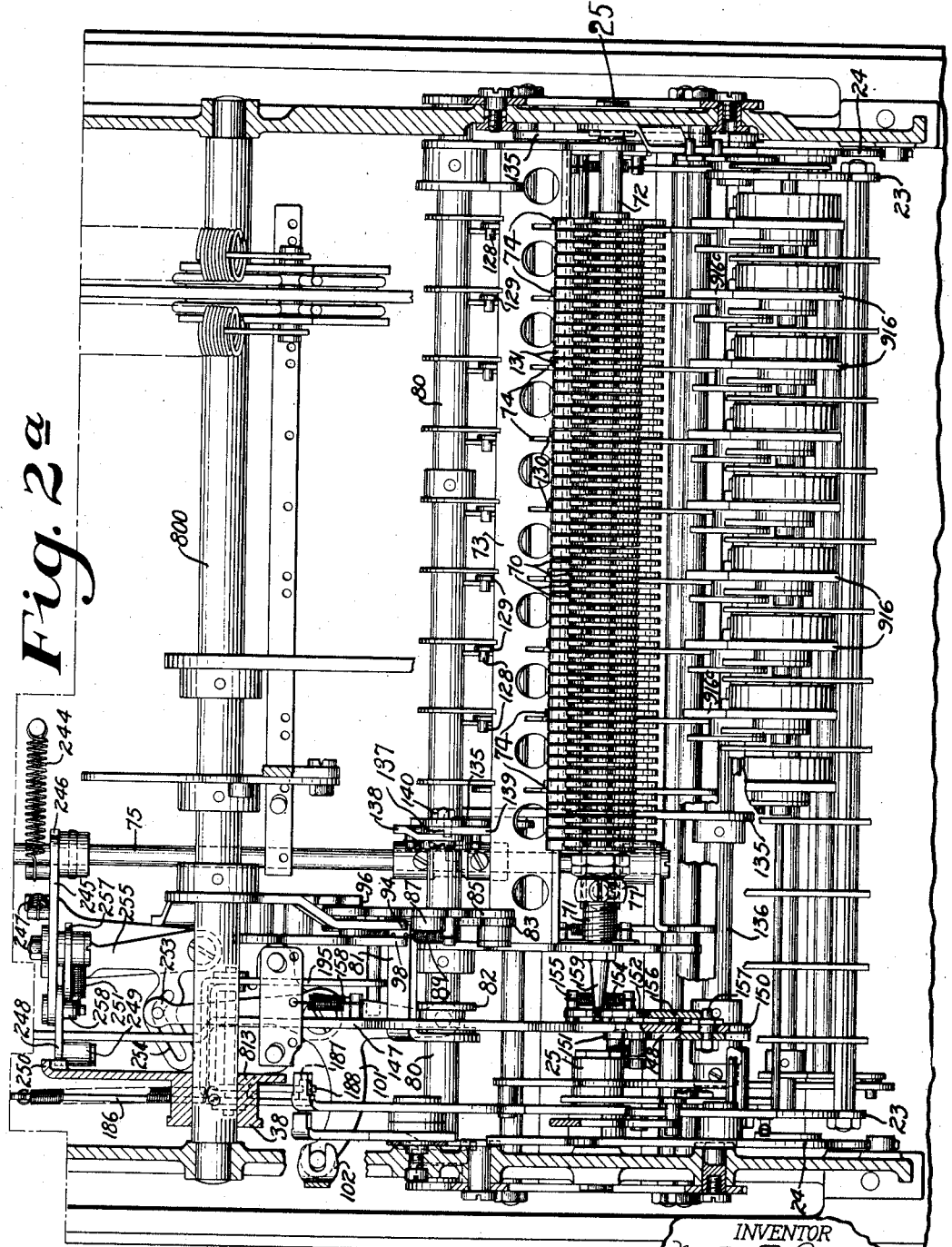

INVENTOR
Walter J. Pasinski
BY
Rector, Hibben, Davis, & Macauley
ATTORNEYS

May 30, 1933.   W. J. PASINSKI   1,911,768
ACCOUNTING MACHINE
Filed Feb. 25, 1927   19 Sheets-Sheet 9

INVENTOR
Walter J. Pasinski
BY
Rector, Hibben, Davis, & Macauley
ATTORNEYS

May 30, 1933.  W. J. PASINSKI  1,911,768
ACCOUNTING MACHINE
Filed Feb. 25, 1927   19 Sheets-Sheet 11

INVENTOR
Walter J. Pasinski
BY
Rector, Hibben, Davis, & Macauley
ATTORNEYS

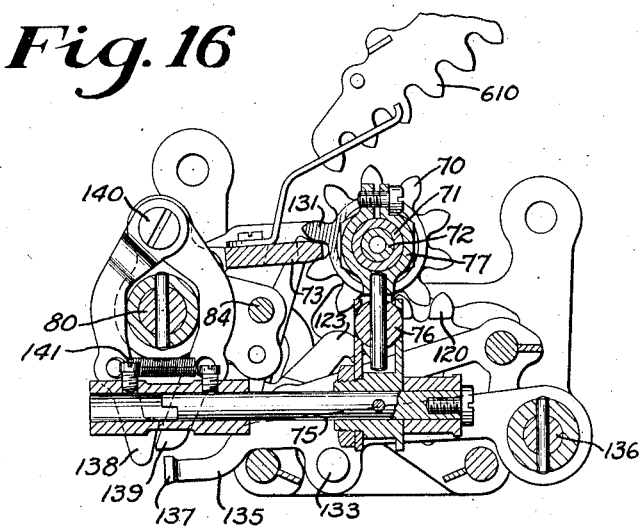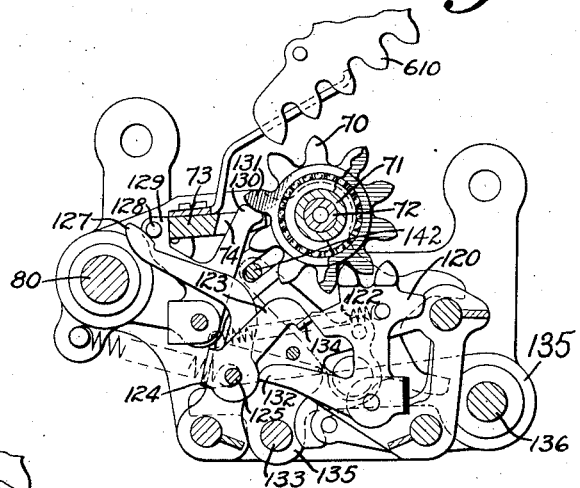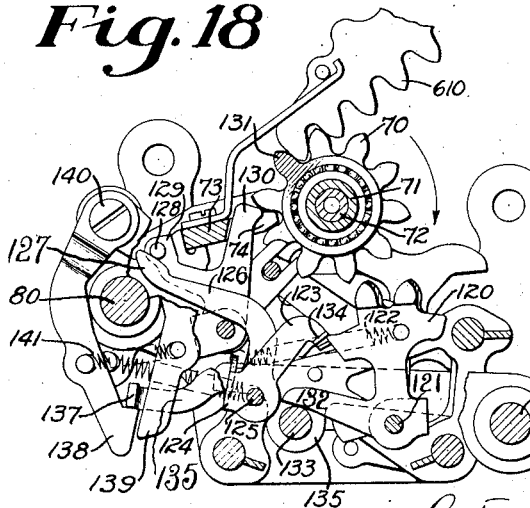

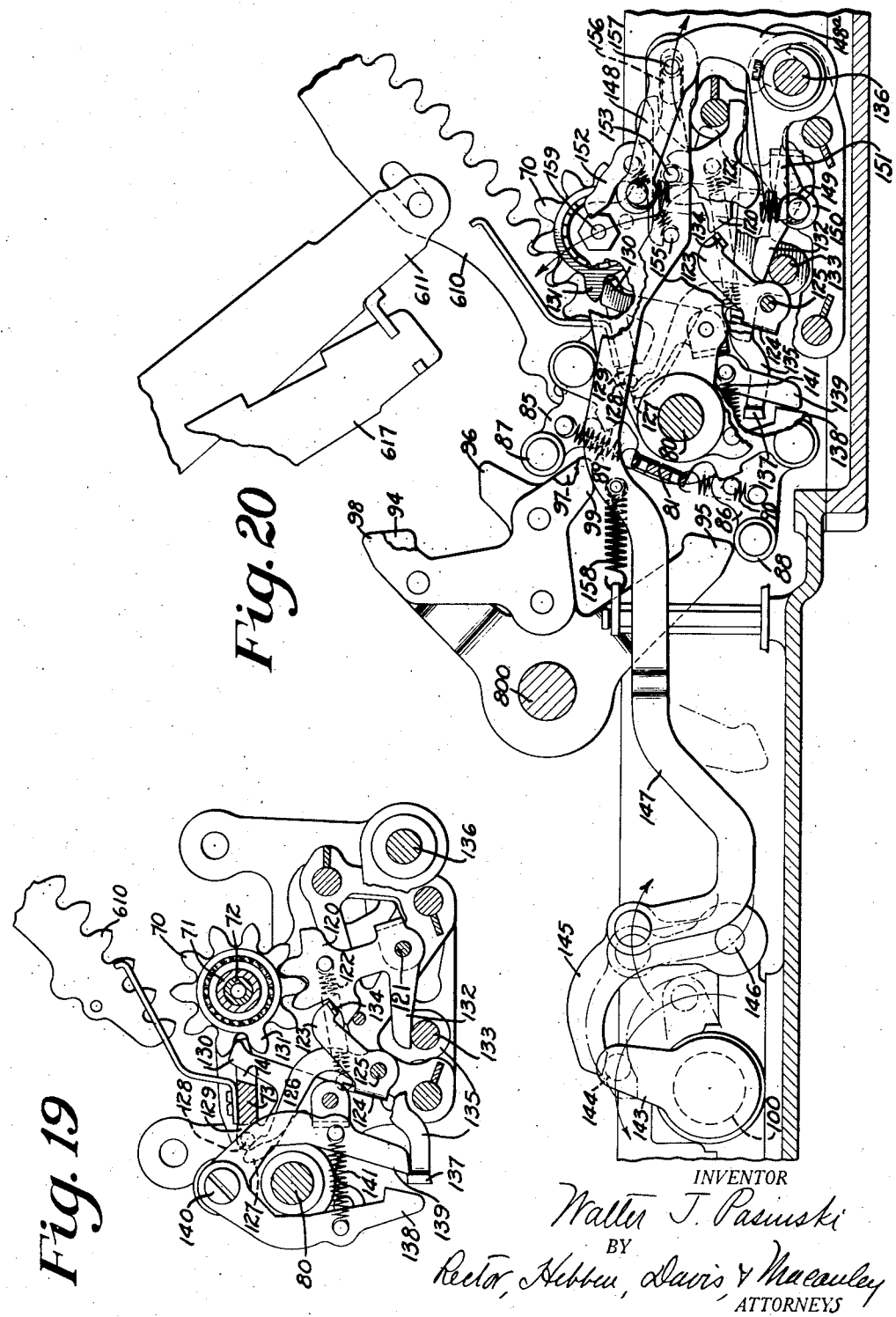

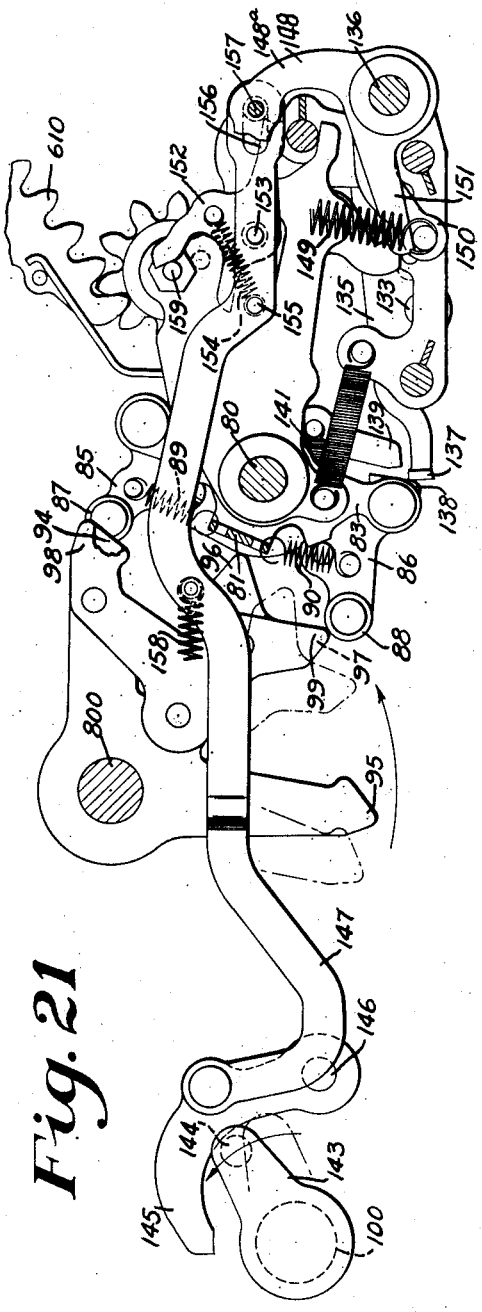
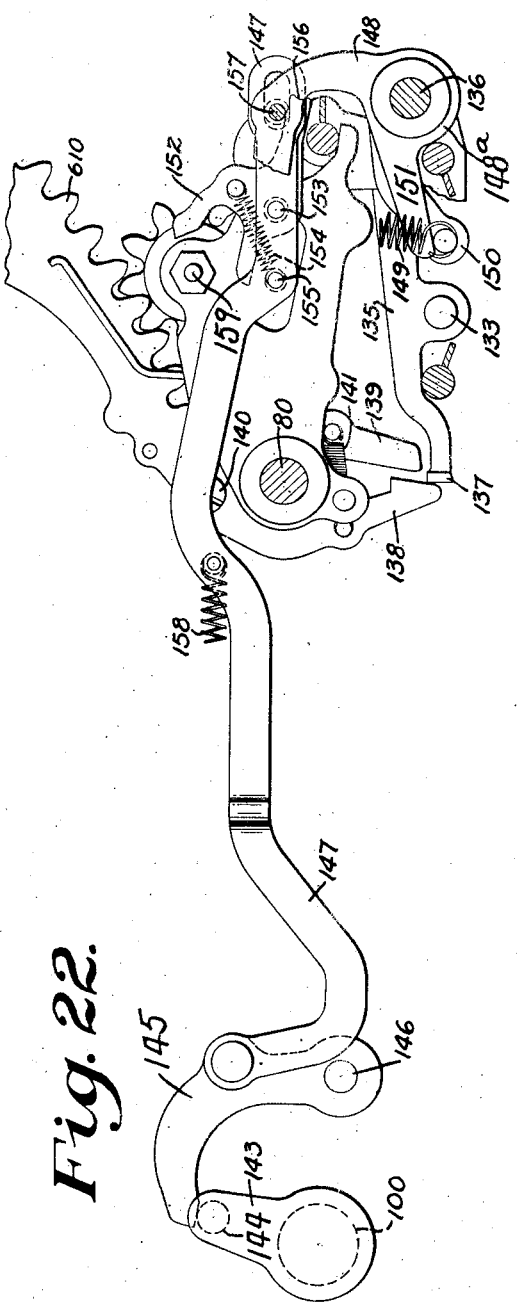

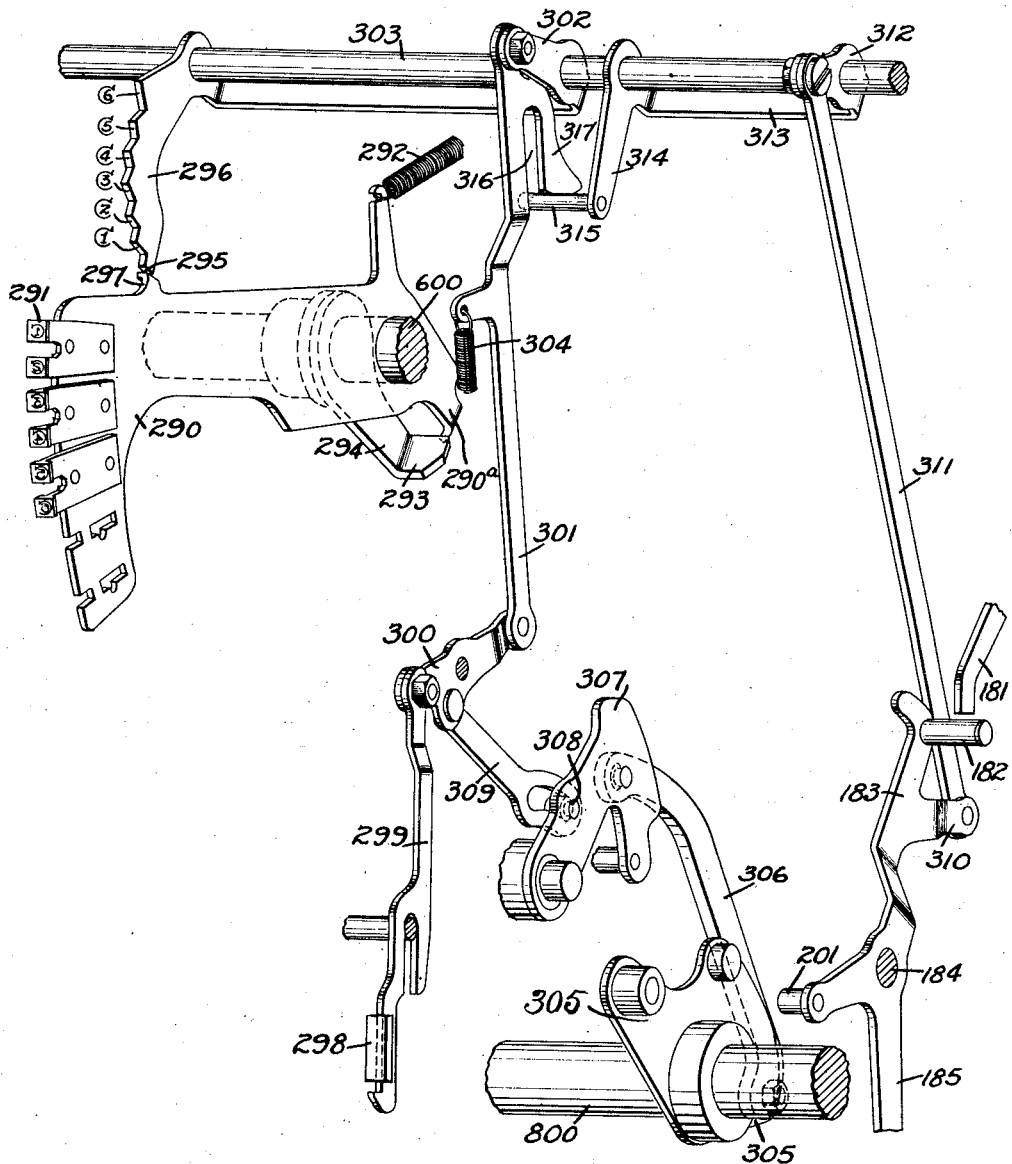

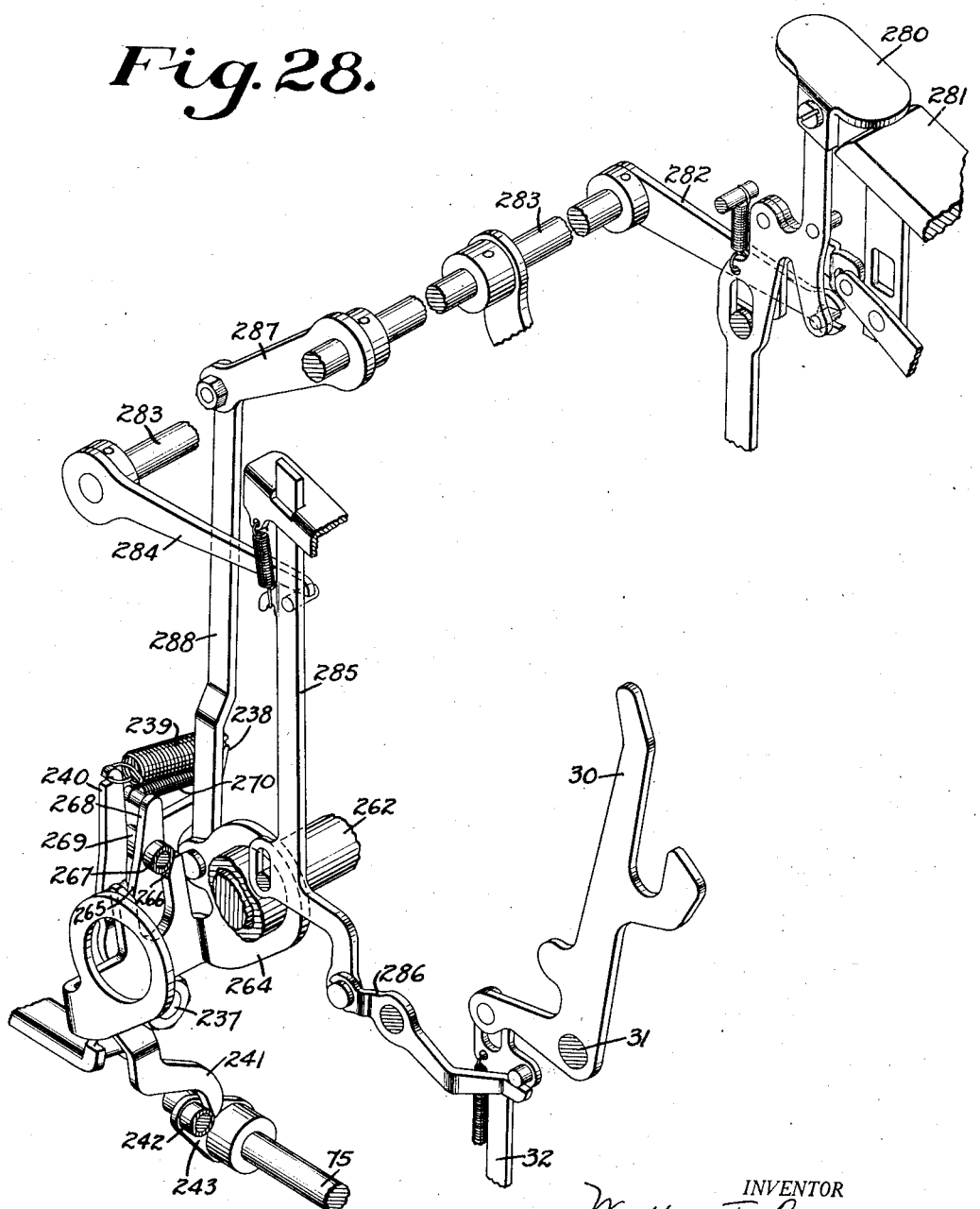

May 30, 1933.  W. J. PASINSKI  1,911,768
ACCOUNTING MACHINE
Filed Feb. 25, 1927    19 Sheets-Sheet 19

Fig. 29.

JOHN A. ------

| OLD BALANCE | DATE | CHECKS IN DETAIL | DATE | DEPOSITS | DATE | NEW BALANCE |
|---|---|---|---|---|---|---|
| 600.00 ℂ | NOV.15'26 | 300.00 ℂ- 200.00 ℂ- 100.00 ℂ- | NOV.15'26 | 500.00 ℂ | NOV.15'26 | 500.00 ℂ * |

JOHN B. ------

| OLD BALANCE | DATE | CHECKS IN DETAIL | DATE | DEPOSITS | DATE | NEW BALANCE |
|---|---|---|---|---|---|---|
| 450.00 ℂ | NOV.15'26 | 100.00 ℂ- 250.00 ℂ- 200.00 ℂ- | NOV.15'26 | 650.00 ℂ | NOV.15'26 | 550.00 ℂ * |

HARRY C------

| OLD BALANCE | DATE | CHECKS IN DETAIL | DATE | DEPOSITS | DATE | NEW BALANCE |
|---|---|---|---|---|---|---|
| 500.00 ℂ | NOV.15'26 | 100.00 ℂ- 200.00 ℂ- 300.00 ℂ- | NOV.15'26 | 500.00 ℂ | NOV.15'26 | 400.00 ℂ * |

MARY D------

| OLD BALANCE | DATE | CHECKS IN DETAIL | DATE | DEPOSITS | DATE | NEW BALANCE |
|---|---|---|---|---|---|---|
| 450.00 ℂ | NOV.15'26 | 100.00 ℂ- 300.00 ℂ- 200.00 ℂ- | NOV.15'26 | 20.00 ℂ | NOV.15'26 | 130.00 ℂ OD. |

ALBERT A. E ------

| OLD BALANCE | DATE | CHECKS IN DETAIL | DATE | DEPOSITS | DATE | NEW BALANCE |
|---|---|---|---|---|---|---|
| 170.00 ℂ- | NOV.15'26 | 10.00 ℂ- 30.00 ℂ- 40.00 ℂ- | NOV.15'26 | 700.00 ℂ | NOV.15'26 | 450.00 ℂ * |

J. H. F ------

| OLD BALANCE | DATE | CHECKS IN DETAIL | DATE | DEPOSITS | DATE | NEW BALANCE |
|---|---|---|---|---|---|---|
| 500.00 ℂ | NOV.15'26 | 100.00 ℂ- 300.00 ℂ- 20.00 ℂ- | NOV.15'26 | 3.00 ℂ | NOV.15'26 | 83.00 ℂ * |

BLANK BANK    BL

| OLD BALANCE | DATE | CHECKS IN DETAIL | DATE | DEPOSITS | DATE | NEW BALANCE |
|---|---|---|---|---|---|---|
| 2500.00 ℂ * | | 2850.00 ℂ ‡ | NOV.15'26 | 2373.00 ℂ * | NOV.15'26 | 1983.00 ℂ * |
| 170.00 ℂ * | | | NOV.15'26 | 1853.00 * | NOV.15'26 | 130.00 ℂ * |
| 2330.00 S | | | | | NOV.15'26 | 1853.00 * |

INVENTOR
Walter J. Pasinski
BY
Rector, Hibben, Davis, & Macauley
ATTORNEYS

Patented May 30, 1933

1,911,768

UNITED STATES PATENT OFFICE

WALTER J. PASINSKI, OF DETROIT, MICHIGAN, ASSIGNOR TO BURROUGHS ADDING MACHINE COMPANY, OF DETROIT, MICHIGAN, A CORPORATION OF MICHIGAN

ACCOUNTING MACHINE

Application filed February 25, 1927. Serial No. 170,869.

This invention relates to a multiple-register accounting machine capable of a wide variety of bookkeeping functions. It is particularly useful where a number of different classes of items must be added to or subtracted from a total, each class listed and added separately, a new total obtained, and separate totals obtained of the different classes of items.

In my co-pending application, Serial No. 123,397, filed July 19, 1926, now Patent No. 1,778,506, of which the present application is a continuation in part, I have disclosed a machine in which, when used in banking work, an old balance may be entered, checks may be subtracted, deposits added, and a new balance obtained. At the time the checks are subtracted they are also added in a separate register from which their total may later be obtained. The present machine will perform the same work and, in addition, the deposits may be added as a class of items so that their total may be obtained. Provision is also made whereby all negative totals or balances will be automatically accumulated in a separate register or registers so that their total may be obtained. The machine is not limited in its use in banking work or to the operations above described but the work mentioned serves as an example to briefly make clear some of the distinctions of the present machine over that in my co-pending application. The large number of registers in the present machine, any one of which may be employed to accumulate items separately, makes possible a large number of different combinations for performing work in bookkeeping, statistical, and commercial departments of bank and business houses.

The general object of this invention is to provide an improved accounting machine having greater flexibility of usage and capable of performing a wider variety of functions than those heretofore employed.

A more particular object is to provide an accounting machine in which a large number of registers are combined and controlled in such a way as to increase the flexibility and variety of work of which the machine is capable.

Other and more particular objects will appear from the specifications and drawings.

An embodiment of the invention is shown in the accompanying drawings in which:

Fig. 1 is a side elevation of the left hand side of the machine with the casing removed.

Fig. 2 is the rear half and Fig. 2ª is the front half of a sectional plan view of the machine.

Fig. 3 is a partial front elevation and section showing the mounting of the multiple lower registers and the manner in which they may be shifted longitudinally to select any one register for operation.

Fig. 4 is a perspective view of the cam for rocking the lower registers into and out of engagement with the actuator racks.

Fig. 5 is a perspective view of the slidable pawl carrying yoke on the lower register frame with which the cam of Fig. 4 cooperates.

Fig. 16 is a sectional side elevation showing the lower registers and the connections for shifting them longitudinally.

Fig. 17 is a sectional side elevation of the transfer mechanism showing it in normal position with the register out of engagement with the actuator racks.

Fig. 18 is a sectional side elevation of the transfer mechanism after an initial carry has been effected.

Fig. 19 is a sectional side elevation of the transfer mechanism with the registers out of engagement with the actuator racks and showing the parts in position when a full carry has taken place.

Fig. 20 is a sectional side elevation showing the registers and the controls therefor in the position they occupy at the end of the forward stroke in an addition operation.

Fig. 21 is a sectional side elevation of the registers, the actuating means therefor, and the controls at the beginning of a forward stroke in the taking of a total.

Fig. 22 is a view corresponding to Fig. 21 with the parts in the position they occupy at the end of a forward stroke.

Fig. 27 is a perspective view of the special character printing segment and its controls for indicating which of the lower registers has been employed in a particular operation.

Fig. 28 is a skeletonized perspective of a selective control of the lower registers by a key which also acts to depress the starting bar of the machine.

Fig. 29 is a composite view illustrating the work that can be performed on the machine.

Fig. 30 is a rear elevation showing another species of cam bar on the paper carriage.

Figure 6:
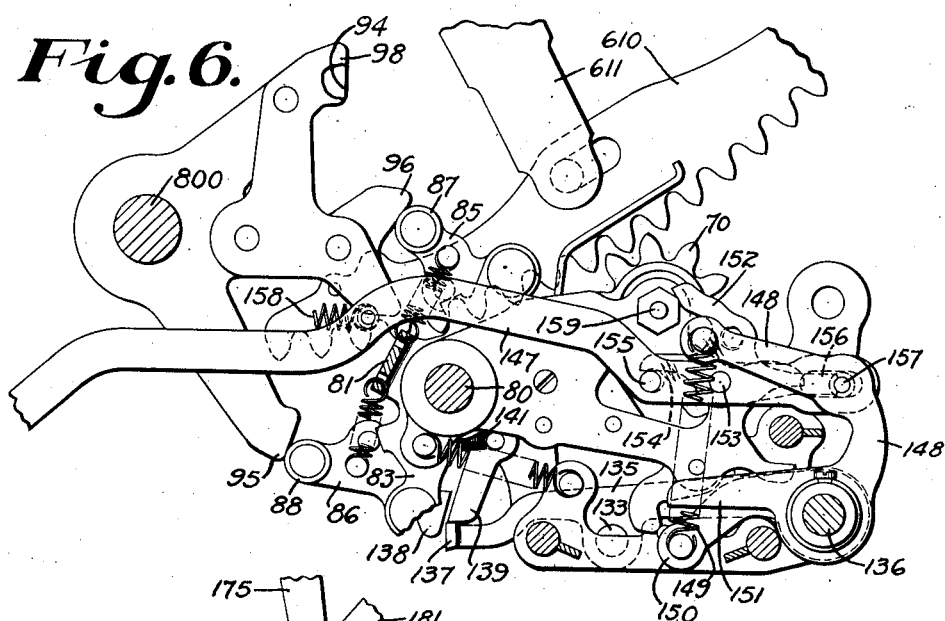
Fig. 6 is a sectional side elevation of the lower registers and means for rocking them into and out of engagement with the actuator racks.

The invention is illustrated in connection with the Burroughs type of adding and listing machine although not unnecessarily limited in its application thereto. In order to avoid unnecessary description of various well known features of the Burroughs machine, reference is made to Burroughs Patents Nos. 504,963 and 505,078, September 12, 1893 and others that will be mentioned from time to time which illustrate and describe in detail various Burroughs constructions that will be referred to only generally in this application.

General structure

The machine is provided with the familiar Burroughs reciprocatory actuator racks 610 mounted in the usual way for carrying purposes on the levers 611 having a segmental series of type plates 618 at their rear ends with which is associated the usual Burroughs printing mechanism including the printing hammers 715. These actuator racks are normally upheld by a swinging frame or bail 617 (Fig. 1) and are individually released and their descent controlled by the usual stop wires 270 set by depression of the amount keys 291. The mechanism is actuated by a rock shaft 800 which is oscillated by a second rock shaft 100; that in turn is oscillated by a handle or by a motor which drives the machine. The machine is given a forward and a return stroke of movement during which operation the shafts 100 and 800 are first rocked counter clockwise as viewed in Fig. 1 and then clockwise. Fixed to the shaft 800 is an arm 813 carrying a passby pawl 821 positioned to engage studs on a three armed lever 913 to which is connected the pitman 914 that rocks the registering mechanism into and out of engagement with the actuator racks 610.

The registering mechanism is of the usual Burroughs type capable of both addition and subtraction. It includes two sets of pinions 916 and 916ᶜ the construction and operation being described in detail in Rinsche Patent No. 1,179,564 April 18, 1916. This registering mechanism will be referred to as the upper or addition-subtraction registering mechanism.

There are six additional registers which make up a lower set and which will be referred to as the lower or multiple registers, the same being hereinafter described in detail.

Automatic carriage

The machine is motor operated and fully automatic. Provision is made for tabulating the paper carriage automatically and for automatically conditioning the machine to perform different functions in different columnar positions of the carriage. The carriage is automatically returned to starting position and line spacing occurs automatically after the carriage has tabulated across the machine. There is also provision for the automatic return of the carriage to normal or the moving of it to predetermined positions by the depression of certain control keys.

The carriage, which is illustrated generally in Fig. 1 and designated by the numeral 10, together with its motor control is substantially similar to that described in Muller Patent No. 1,397,774, November 22, 1921; Rinsche No. 1,580,534, April 13, 1926 and the application of A. S. Trew, Serial Number 724,086 filed July 3, 1924 now Patent No. 1,723,668. The carriage tabulating mechanism may be disabled and the line space means enabled by means of a special key operating in the same manner as that shown in Kilpatrick No. 1,152,517, September 7, 1915. The carriage may also control the automatic split or cipher cut-out as shown in said Kilpatrick patent and in Gascon No. 1,395,991, November 1, 1921.

Although the machine is fully automatic the description of the mechanism will be more easily understood by following through the operations of the machine without regard to how the functions are controlled and in some cases as though they were manually controlled and as though the machine were given a stroke of operation by means of a handle but it will be understood that the various operations are automatic and that the sequence in which they occur is determined by the adjustment of the automatic carriage control and the other automatic features of the machine.

*Upper or addition-subtraction registering mechanism*

The addition-subtraction registering mechanism and its controls, being of the type shown and described in detail in Rinsche Patents Nos. 1,172,484, February 22, 1916 and 1,179,564, April 18, 1916, will be described only generally here.

The registering mechanism comprises two sets of pinions 916 and 916° which are in mesh with each other, one set being mounted on one side of the pivot 22 of a rocking cradle 23 and the other set being mounted on the other side of the pivot. This rocking cradle is mounted in a rocking frame 24 which is pivoted on frame studs 25 (Fig. 2ª) on the side frames of the machine. The position of the rocking cradle 23 determines which set of pinions shall engage the actuator racks 610 when the frame 24 is moved to engage the registering mechanism with the racks. When the pinions 916 are directly engaged with the racks they are rotated clockwise as the racks ascend to perform addition, but when the pinions 916° are engaged with racks the rotation of these pinions will rotate the pinions 916 in the opposite direction which results in subtraction.

The registering mechanism is rocked into and out of engagement with the racks by means of the pitman 914 in a manner described in detail in the patents referred to. The selection of which of the two sets of pinions shall engage with the rack is controlled by the subtraction control lever as explained in the Rinsche Patent No. 1,172,484 or by the carriage, as explained in the Muller Patent No. 1,397,774. In order that the operation of these parts may be understood without reference to said patents they will be briefly described but reference is made to said patents for details.

*Addition and subtraction on upper registering mechanism*

The upper registering mechanism is normally in mesh with the actuator racks as shown in Fig. 1. At the beginning of the forward stroke of the machine the shaft 800 with the arm 813 is rocked counter clockwise which causes the passby pawl 821 to rock the three armed lever 913 counter clockwise to move the pitman 914 forward or to the right as viewed in Fig. 1. The upper branch of the forward end of the pitman 914 engages a stud on the register frame 24 to rock the registering mechanism out of engagement with the racks. The registering mechanism remains out of engagement during descent of the racks and until just at the end of the forward stroke of the machine when a stud 26 on the oscillating arm 813 engages a shoulder 27 on the link 28 connected to the register frame thereby pulling the link rearward to rock the frame to move the registering mechanism into engagement with the racks so that, as the racks are returned upward to normal, the amount set up in the machine will be entered in the registering mechanism. During the return stroke of the machine the arm 813 is rocked clockwise and its passby pawl 821 would normally engage a stud on the three armed lever 913 to rock that lever clockwise to pull the pitman 914 to the rear but the pitman has already been moved to the rear by the means described above so that this action does not take place.

The operation of the parts is the same for subtraction as for addition except that when the subtraction is performed the cradle 23 is positioned so that the pinions 916° engage the racks instead of the pinions 916. This results in the pinions 916 being rotated in the opposite direction to what they would be if they engaged the racks directly.

The carrying mechanism for the upper registering mechanism is of the familiar Burroughs type. The same carrying mechanism serves both sets of pinions of the upper registering mechanism.

Manual control of subtraction in upper registering mechanism

As previously mentioned the position of the cradle carrying the two sets of pinions is selectively determined by means of a lever 30 which, for convenience, is called the "subtraction lever", although it conditions the machine for addition as well as subtraction. The cradle may also be positioned by the carriage as will be later explained.

The subtraction lever 30 is pivoted at 31 and provided with a rearwardly extending arm connected to a vertical link 32 having a lateral arm 33 carrying a roller operating in a cam slot in a pitman 34 pivoted at its forward end to a cam lever 35.

As illustrated in Fig. 1 the lever 30 is in addition position. When it is pulled forward from this position to the subtraction position it raises the link 32 and the pitman 34 thereby positioning a shoulder 36 on the pitman in the path of a stud 37 on a plate 38 fixed to the oscillating shaft 800. With the parts in this position a forward stroke of the machine causes the stud 37 to engage the shoulder 36 and pull the pitman 34 rearwardly, thereby pulling the lever 35 clockwise about its pivot 31. The lever 35 is provided with a cam slot 39 in which travels a roller on a pivoted arm 40 whose forked forward end engages over a stud on a rearwardly projecting arm of the cradle 23 carrying the two sets of register pinions. Accordingly, when the pitman 34 is moved rearwardly, the arm 40 is moved counter clockwise which rocks the cradle clockwise to move the upper set of pinions 916 out of position to engage the racks and places the lower set in position to engage them. This rocking movement of the cradle occurs during the forward stroke of the machine and after the upper registering mechanism is moved out of engagement with the racks at the beginning of the forward stroke.

When the subtraction lever 30 is moved from subtraction to addition position the link 32 and its pitman 34 are moved downwardly to put a shoulder 46 on the lower end of the pitman into the path of a stud 47 on the oscillating plate 38 so that during the forward stroke of the machine the pitman 34 is thrust forwardly to move the cam arm 35 counter clockwise which cams the arm 40 clockwise to position the upper pinions for engagement with the racks when the register frame is rocked to mesh the registering mechanism with the racks.

Carriage control of subtraction in upper registering mechanism

The upper registering mechanism is automatically controlled by the paper carriage so that the machine will automatically add, subtract, or perform other functions depending upon the columnar position of the carriage. The mechanism for controlling subtraction is briefly as follows:

Suitable rollers 49 on the carriage act on one arm 50 of a yoke whose other arm 51 is connected to a lever 52 pivoted at 53. The lever 52 has an inwardly extending stud engaging the rearwardly extending arm of a pivoted bell crank lever 54 whose upper arms carries a stud adapted to engage a slot in a link 55 connected to the subtraction lever 30. When the carriage reaches the columnar position for subtraction the roller 49 strikes the arm 50 and rocks the yoke to rock the arm 52 clockwise which in turn rocks the bell crank 54 clockwise and thrusts the link 55 forward to push the subtraction control lever to subtraction position. This conditions the machine to perform subtraction the same as if the lever 30 had been moved forward by hand. When the carriage passes the columnar position for subtraction the lever 54 is automatically returned to its original position by a spring 56 which returns the subtraction control lever 30 to addition position.

Total and sub-total on upper registering mechanism

When a total is to be taken on the upper registering mechanism the total key 60 is depressed, said key being connected to a bell crank lever 61 carrying a stud 62 positioned so as to act on a link 63 connected to the pitman 914. Depression of the total key moves the pitman downward to move its upper branch out of the path of the stud on the register frame so that the frame will not be moved as the pitman is moved forwardly to throw the registering mechanism out of engagement with the actuator racks. If the registering mechanism is in engagement with the racks at the beginning of the forward stroke no movement of the register frame will take place and the pinions will remain in engagement with the racks but if the registering mechanism should be out of engagement with the racks, as it would be after a non-add operation, the depression of the pitman by the total key will have positioned the lower branch of the pitman so that it will engage a stud on the lower part of the register frame to rock the frame counter-clockwise to move the registering mechanism into engagement with the actuator racks.

At the beginning of the return stroke the passby pawl 821 acts on a stud on the three armed lever 913 to rock the latter clockwise which pulls the pitman 914 rearwardly. At this time the lower branch of the pitman is in engagement with a stud on the lower part of the register frame and the rearward movement of the pitman rocks the frame clockwise to move the pinions out of engagement with the racks. This manner of taking a total is well known in Burroughs machines and need not be described in further detail.

When a sub-total is to be taken the sub-total key 65 is depressed and the stem of this key acts on the total key bell crank lever 61 to move the link 63 downward to disable the connections for moving the upper registering mechanism out of engagement with the racks at the beginning of the forward stroke in the same way as if a total were to be taken. In the taking of a sub-total it is necessary to allow the registering mechanism to remain in engagement with the racks during their ascent instead of disengaging it prior to the ascent as in taking a total. The sub-total key is connected to a bell crank lever 66 which by suitable connections, not shown in detail, rocks a lever 69 to a position such that it disables the passby pawl 821 at the end of the forward stroke of the machine and thereby prevents the three armed lever 913 from being rocked clockwise to move the pitman 914 rearwardly at the beginning of the return stroke and thus prevents the registering mechanism from being rocked out of engagement with the racks.

*Negative total and sub-total on upper registering mechanism*

A true negative total or sub-total can be taken on the upper registering mechanism by taking a total or a sub-total in the usual way when the subtraction lever is in subtraction position. In such event the pinions 916c are moved into engagement with the racks instead of the pinions 916 and the printing segments are positioned from these pinions so as to print the true negative total or overdraft. The "fugitive one" is automatically taken care of by mechanism provided for that purpose described in detail in Rinsche Patent No. 1,172,484, February 22, 1916 to which reference is made.

*Multiple lower counters*

In addition to the upper registering mechanism, which is capable of both addition and subtraction, there is provided a series of lower registers that are independent of the upper registering mechanism and any one of which may be rocked into engagement with the racks 610 which are made longer than usual in order to receive them. These lower registers are movable longitudinally to permit any one of them to be selectively positioned in alignment with the actuator racks so that, when the lower register frame is rocked, the selected register will be moved into engagement with the racks, leaving the other registers idle.

The pinions 70 (Fig. 2a) which make up the lower registers are interspersed and all mounted on a common support comprising a sleeve 71 carried by a shaft 72 on the lower register frame. In the construction shown, nine pinions constitute a single register and there are six sets of these pinions making up six registers. The units pinions for each register are adjacent each other, the tens pinions for each register are adjacent each other, and so forth for the entire series for each denominational order. The pinions for each denominational order occupy a space substantially equal to the space between adjacent actuator racks. This construction reduces the longitudinal movement required to move different registers to active position. Each of the pinions is provided with ball bearings to reduce friction and each is rotatable independently of the other. In order to prevent the rotation of any but the desired set of pinions an aligning plate 73 (Fig. 2a) is provided having a bevelled edge engaging between the teeth of the inactive counter pinions. This plate is provided with slots 74 opposite the actuator racks so as to permit rotation of the register pinions which are in line with the actuator racks while all the other pinions are prevented from rotating. In this manner pinions of the register which is in active position may rotate freely but their rotation will not move any of the other pinions by frictional contact or in any other accidental manner.

The registers are moved longitudinally to align different sets of pinions with the actuator racks by sliding the sleeve 71 on the shaft 72. This is accomplished by rocking a shaft 75 which is connected by a universal joint 76 to an adjustable clamp 77 screw threaded to the sleeve 71. This screw threaded adjustment permits the sleeve to be accurately set so that the different registers will be moved into exact alignment with the racks when the sleeve is shifted to its different positions. The manner in which the shaft 75 is rocked to selectively position the different registers will be later described in detail but prior to this an explanation will be given of the mechanism for rocking the lower register frame to move the selected lower register in to and out of engagement with the actuator racks.

Figure 7:
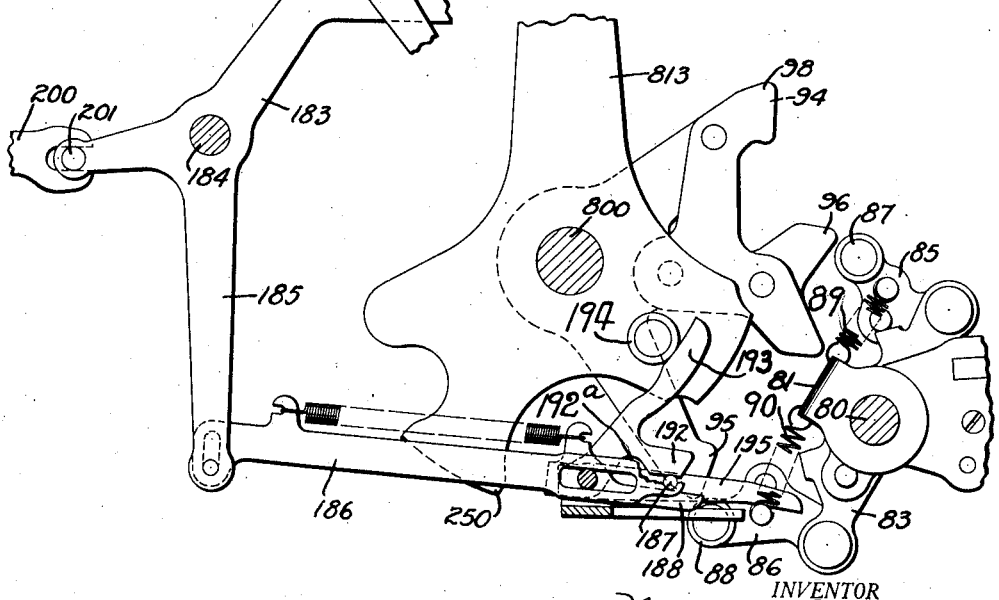
Fig. 7 is a view similar to Fig. 6 including also the non-add mechanism for the lower registers.

Slidably mounted on the shaft 80 is a yoke 81 (Figs. 2a and 5) having one arm connected to a sleeve 82 by means of which the yoke is adjusted along the shaft. The other arm of the yoke has an extension 83 provided with an opening loosely receiving the stationary rod 84 which permits sliding motion of the yoke but prevents it from rotating on the shaft 80. The yoke has an upwardly extending portion carrying a passby pawl 85 supporting a cam roller 87, and a downwardly extending portion provided with a passby pawl 86 carrying a cam roller 88 (Figs. 6 and 7). The pawls are normally drawn toward one another by springs 89 and 90 (Fig. 7), movement of the pawls towards one another being limited by suitable stops. The register frame is thus provided with a set of passby pawls that may be engaged by a cam to rock the register. The pawl carrying yoke can be adjusted longitudinally to align the cam rollers 87 and 88 with different cam surfaces on the cam.

The register frame is rocked to move the registers into and out of engagement with the racks by means of a multi-surface cam illustrated in perspective in Fig. 4. This cam is fixed to the shaft 800 so that it first oscillates counter-clockwise as viewed in Figs. 4 and 6 and then returns clockwise as the machine is given a return stroke of movement.

The manner in which the cam rocks the register frame can be most easily explained by describing the action of the mechanism in performing certain functions.

Addition on lower registers

When the lower registers are to be used for addition, the two cam surfaces 94 and 95, which are in vertical alignment, are employed by moving the yoke 81 to a position such that the cam rollers 87 and 88 are in alignment with the surfaces 94 and 95. The normal position of the cam is illustrated in dot and dash lines in Fig. 21. The registers are normally out of engagement with the racks. During the major portion of the forward stroke, the cam will not move the register frame because the surface 94 passes the roller 87 which merely moves the pawl 85 against the tension of its spring. At the end of the forward stroke the surface 95 strikes the roller 88 and rocks the register frame counter-clockwise, which moves the selected register into engagement with the racks. The register remains in engagement with the racks until just at the end of the return stroke of the machine when the cam surface 94 strikes the roller 87 and rocks the register frame clockwise to move the registers out of engagement with the racks. The registers are thus kept out of engagement with the racks during descent of the latter, and rocked into engagement with them prior to their ascent so that the amount set up in the machine is added in the register after which the register is rocked out of engagement with the racks to its normal position.

Total and sub-total on lower registers

When a total is to be taken, it is necessary to have the selected register in engagement with the racks during their descent, and out of engagement with them during their ascent.

For this purpose the cam surfaces 96 and 97 are employed. Assume that the cam is in the dot and dash position of Fig. 21 and that the register is out of engagement with the racks. At the beginning of the forward stroke the cam surface 97 strikes the roller 88 as shown in full lines in Fig. 21 and rocks the register into engagement with the racks where it remains during descent of the latter. At the end of the forward stroke the cam occupies the position illustrated in Fig. 20. At the beginning of the return stroke the cam surface 96 strikes the roller 87 and rocks the register frame clockwise, which moves the selected register out of engagement with the racks. During the return movement the surface 97 wipes past the lower cam roller 88.

When a sub-total is to be taken, the selected register must be moved into engagement with the racks at the beginning of the forward stroke, and it must be allowed to remain in engagement with them during both the descent and the ascent of the racks.

For this purpose the cam surfaces 98 and 99 are employed. The action of the cam surface 99 in rocking the selected register into engagement with the racks is the same as the action of the surface 97. At the end of the forward stroke, the cam occupies the position of Fig. 20, but upon the return stroke there is no surface such as 96 to rock the register out of engagement with the racks. Instead there is no rocking action until near the end of the return stroke when the surface 98 strikes the cam roller 87, and moves the register out of engagement with the racks and to its normal position after the sub-total has been taken.

Lower register total and sub-total controls

The yoke 81 carrying the cam rollers 87 and 88 is shifted to its various positions for addition, totaling, and sub-totaling by means of a bell crank lever 101 (Figs. 1 and 2ª), one arm of which has a pin engaged in an annular groove in the sleeve 82 connected to the yoke 81, and the other arm of which has a stud engaged by the forked end of the lever 102 pivoted at 103. The opposite end of the lever 102 is connected to the lower end of a lower register lever 104, pivoted at 105. This control lever normally occupies a central position such as shown in Fig. 1 in which position the yoke 81 is in its central position with cam rollers 87 and 88 in position to be acted upon by the adding cam surfaces 94 and 95, so that the machine normally adds in the selected lower register.

Figure 12:
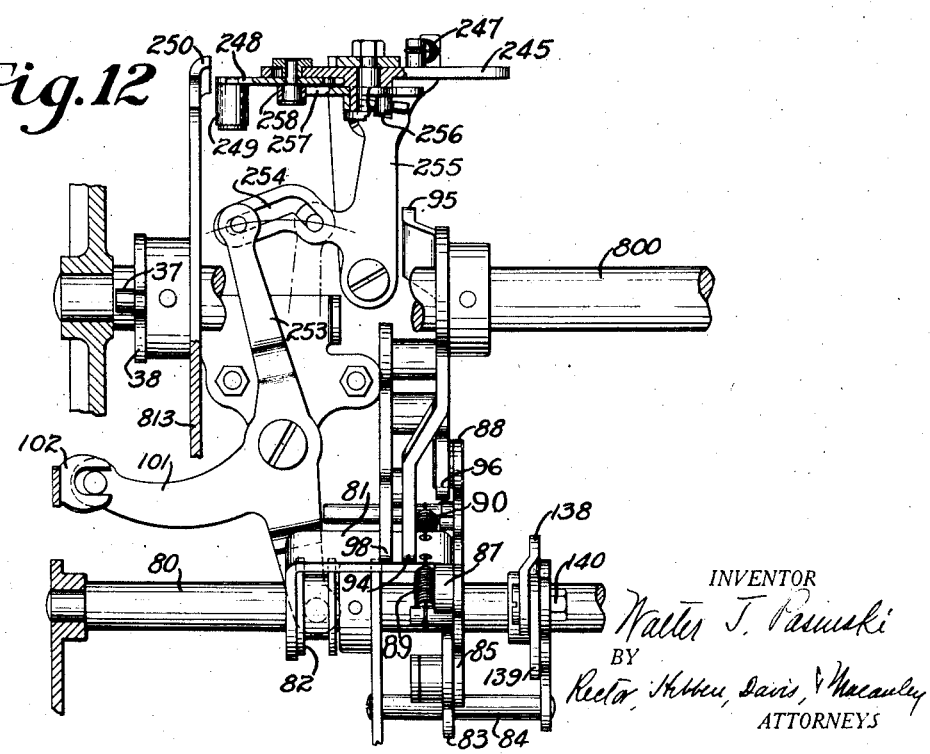
Fig. 12 is a partial sectional plan view illustrating the manner in which the lock for the selective register control is affected by the total and sub-total control of the lower registers.

When the control lever 104 is moved forward to its "total" position, the lower end of the lever 102 is also moved forward which moves the bell crank lever 101 counter clockwise, as viewed in Fig. 2ª, to the position illustrated in Fig. 12. This shifts the yoke 81 to the right to position the rollers 87 and 88 in alignment with the total taking cam surfaces 96 and 97.

When a sub-total is to be taken, the control lever 104 is moved rearwardly to its "sub-total" position which moves the lower end of the lever 102 to the rear and rocks the bell crank lever 101 clockwise from the position of Fig. 2ᵃ to move the yoke 81 to the left to position the cam rollers 86 and 87 in alignment with the sub-total surfaces 98 and 99.

The control lever 104 is held in its central or normal position as well as in its total and sub-total position by a pivoted latch 106 (Figs. 1 and 23), having notches in its upper edge engaged by a roller stud 107 on the lever 104. The latch is urged in a counter-clockwise direction by a spring 108, which maintains the notches in engagement with the stud. The latch is released at the same time that the usual Burroughs restoring bail is operated to release the keys of the machine. The lower end of the arm 315 (Fig. 1) to which the restoring bail is connected carries a stud that engaged the hooked end 109 of a rearwardly extending arm of the latch 106 so that when the restoring bail 202 is rocked clockwise at the end of the return stroke of the machine, the latch 106 is rocked clockwise to release the control lever 104 which is returned to its central positions from either of its other positions by means of a pair of spring held elbow levers 110 and 111 (Fig. 23) engaging over a stud 112. These elbow levers are pivoted at 113, and a spring 114 connects them.

*Transfer mechanism—lower registers*

A single transfer mechanism is employed for all of the lower or multiple registers, said mechanism being illustrated in its different positions in Figs. 17, 18 and 19.

It includes a series of transfer segments 120 pivoted on a shaft 121 and normally urged in a counter-clockwise direction by springs 122. Each segment is held against movement by a detent 123 comprising one arm of a yoke 124 pivoted on the shaft 125. The other arm 126 of the yoke extends upwardly and to the rear, and is formed with a nose 127 adapted to be engaged by stud 128 on the arm 129 of a trip pawl 130. Each of the register pinions has one wide tooth 131 for tripping its respective pawl 130 when the pinion moves from 9 to 0. The pawl 130 also serves as a stop for limiting the rotation of its pinion when the register is restored to "0" in the taking of a total or sub-total. The trip pawl 130 for any one pinion controls the detent for the transfer segment of the pinion of next higher order so that when one pinion moves from 9 to 0, the pinion of next higher order is moved one step by the transfer mechanism.

The operation of the transfer mechanism is as follows:—

The parts normally occupy the position illustrated in Fig. 17. When one of the pinions is rotated from its "9" to its "0" position or beyond in the clockwise direction as viewed in Fig. 18 the wide tooth 131 cams the trip pawl 130 counter-clockwise which pushes the nose 127 on the arm 126 downward and raises the detent 123 from behind its shoulder on the carry segment 120. The spring 122 then snaps the carry segment counter-clockwise to its "initial carry" position with the tail 132 of the segment contacting the restoring bail 133 as shown in Fig. 18. Each tripped carry segment 120 moves under a lateral lug 134 on its detent 123 and the detent is thus prevented from moving back to its normal position.

This "initial carry" takes place during the time that the register is in engagement with the actuating racks during the return stroke of the machine. Near the end of the return stroke the register is rocked out of engagement with the racks and the restoring bail 133 is lowered which releases the carry segments and those that have been tripped are immediately moved rearward by their springs to their "full carry" positions shown in Fig. 19. The bail 133 is not lowered until the register pinions are disengaged from the racks so that the carry does not take place until the pinions are free of the racks and in mesh with the carrying segments.

The restoring bail is carried by two side arms 135 fixed to a shaft 136. The left arm 135 (Figs. 2ᵃ and 16) has an extension provided with a laterally extending lug 137 operating between two pivoted latches or detents 138 and 139. These latches are pivoted at 140 to the register frame above the shaft 80 to which the register frame is fixed and about the axis of which it rocks. A spring 141 urges the two latches toward one another.

Normally the parts occupy the position illustrated in Fig. 16. On the forward stroke of the machine the restoring bail is urged upwardly by means hereinafter described, but at the beginning of the stroke the register pinions are in engagement with the carry segments and it is not desirable to move the segments immediately. Accordingly the parts are coordinated so that the shoulder 137 on arm 135 is blocked against upward movement by the lower end of the detent 139 as shown in Fig. 16. As the register frame is rocked to move the pinions into engagement with the racks near the end of the forward stroke of the machine the pivot 140 of the latches 138 and 139 moves counter-clockwise from the Fig. 16 to the Fig. 22 position. The shoulder 137 is thus free from the end of the latch 139 and the arm 135 may thereupon move upwardly to carry the restoring bail 133 upwardly to restore the tripped carry segments as shown in Fig. 20. This restoring action takes place after the register pinions have moved out of engagement with the carry segments so that movement of the carry segments will not move the register pinions. The restoring bail is moved slightly higher than the position shown in Fig. 18 that is, to the position illustrated in Fig. 20 in order to insure that all the carry segments will be returned to normal. When the restoring bail is released it drops back to the position of Fig. 18 where the lug 137 rests on the shoulder formed by the nose on the end of the latch 138.

When the "initial carry" takes place the restoring bail is in the position of Fig. 18 where it holds the tripped carry segments in "initial carry" position. As the register frame is rocked clockwise from the position of Fig. 18 to move the register out of engagement with the racks the pivot 140 of the latches 138 and 139 moves to the right in Fig. 18 and swings the lower ends of the latches to the left which finally results in disengaging the nose of latch 138 from under the shoulder 137 and the parts are constructed so that when the register has been moved out of engagement with the racks and into engagement with the carry segments the lug 137 is released whereupon it moves toward the position of Fig. 19 and releases the carry segments.

Provision is made for holding the register pinions against movement during the time that they are being moved bodily into and out of engagement with the racks for which purpose a bail 142 (Fig. 17) is provided having connections for rocking it into and out of engagement with the register pinions at the appropriate time, an understanding of said connections not being necessary for the purpose of the present application.

The restoring bail is operated through connections from the oscillating shaft 100 (Figs. 1 and 21) to which is fixed an arm 143 having a stud 144 engaging the under side of a curved arm 145 pivoted on a machine stud 146 and connected to a link 147 which in turn is connected by a pin and slot connection to the arm 148 of a bell crank lever 148a pivoted loosely on the shaft 136. The arm 148 is connected by a spring 149 to an arm 150 fixed to the shaft 136 which also carries the side arms 135 of the restoring bail 133. The link 147 thus operates the restoring bail through a yielding connection. In order to provide positive operation in one direction the other arm 151 of the bell crank lever is positioned so as to contact a stud on the arm 150 as illustrated in Fig. 21.

The pin and slot connection between the link 147 and the arm 148 is normally made a rigid connection by means of a dog 152 which is pivoted on the link 147 at 153 and is urged counter-clockwise by a spring 154 so as to maintain the dog against a stop 155. In this position of the dog its tail 156 is in front of a pin 157 on the arm 148 so that movement of the link 147 to the right, as viewed in Fig. 20, will move the arm 148.

The normal position of the forward end of the link 147 is shown in dot and dash lines in Fig. 20. During the forward stroke of the machine the arm 143 rocks to the full line position of Fig. 20 and moves the link 147 to the right to its full line position which rocks the arm 148 clockwise and through the spring 149 places a tension on the arm 150 that tends to move the restoring bail 133 upwardly. This tension is applied gradually during the forward stroke of the machine but the restoring bail is not permitted to move upwardly until near the end of the forward stroke when it is released as heretofore described at which time it moves up quite suddenly.

During the return stroke the arm 143 on the shaft 100 returns from its full line to its dot and dash line position in Fig. 20. This releases the link 147 which is returned to the left by the spring 158. The link acts directly on the pin 157 on the arm 148 and the arm 151 acts directly on the stud on the arm 150 so that the spring 158 acts directly to move the restoring bail downwardly but movement is prevented until the shoulder 137 is released from the nose of the pawl 138 as heretofore described.

Figure 13:
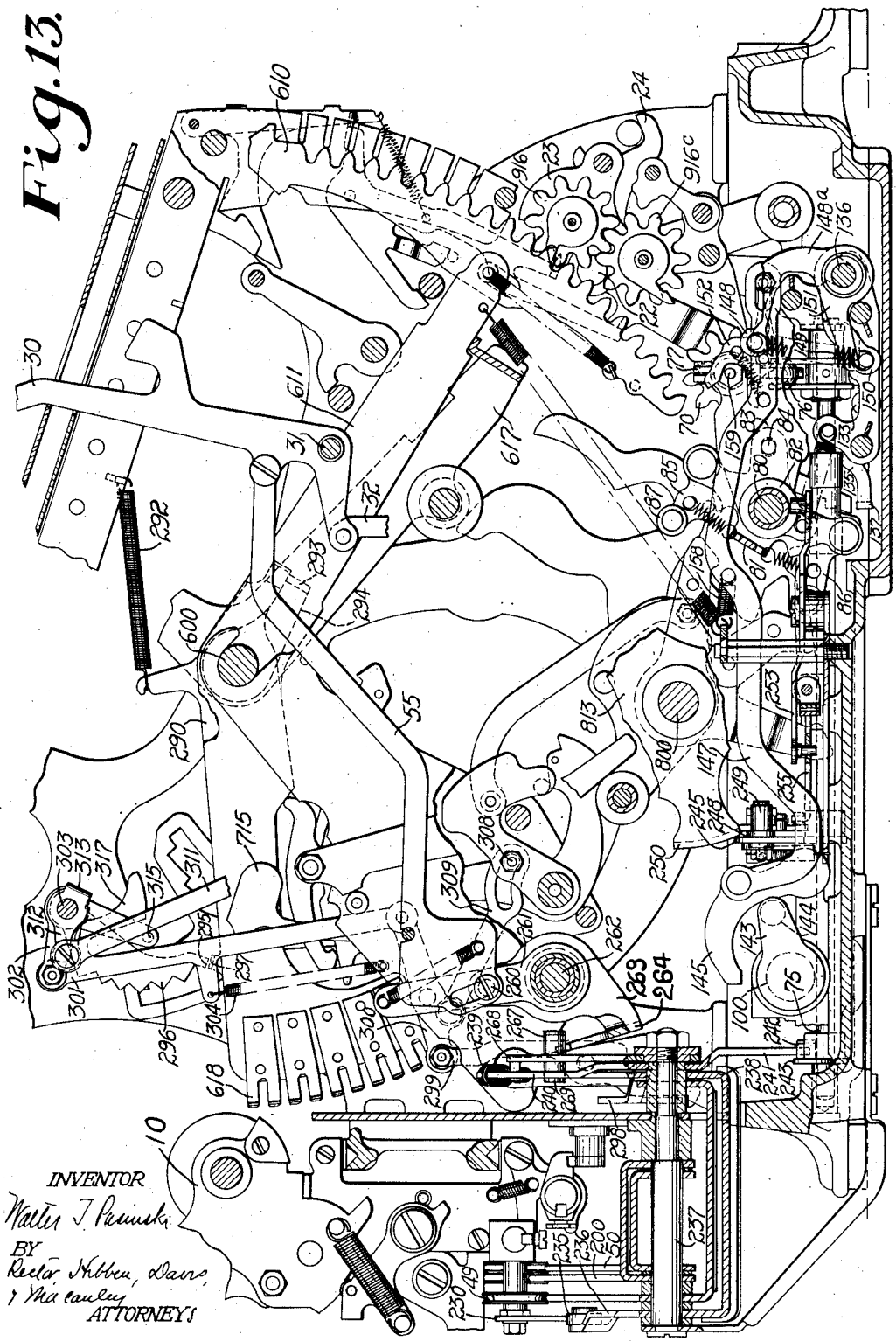
Fig. 13 is a sectional side elevation of the left hand side of the machine with some of the parts omitted to show others more clearly particularly the manner in which the selection of registers is affected by the subtraction control lever.

Special provision has been made for preventing the accidental disturbance of the transfer mechanism during taking of a total which provision includes the dog 152. When a total is taken the register pinions are moved into engagement with the racks at the beginning of the forward stroke of the machine and the pinions are then rotated to "0" by the racks as they descend. The pinions are stopped in their "0" position by the detents 130 which limit the movement of the pinions and determine the positions to which the racks shall descend. As the machine is operated to take a total the shaft 100 is rocked which moves the link 147 to the right in Fig. 20 as heretofore explained. This movement of the link tends to move the restoring bail upwardly and if the mechanism operated the same in taking a total as in addition the restoring bail would move upwardly at the end of the forward stroke. As the restoring bail moves upwardly and rocks the carry pawl segments clockwise the lateral lugs 134 on the detents 123 ride slightly upward over the high point on the shoulder on the transfer segments. This moves the noses 127 away from the studs on the detents 130 leaving the latter in floating condition. This would occur only for an instant and there is not much likelihood of the detents moving but in order to insure that there cannot be any possibility of the movement, provision has been made for eliminating the movement of the restoring bail when a total is taken because it is not necessary to restore the carry segments in the taking of a total. This is accomplished by having an extension 159 on the register shaft 72 (Figs. 21 and 3) positioned so as to cam the dog 152 to disconnect the link 147 from the arm 148 as the register is moved into engagement with the racks. The normal position of the parts is illustrated in Fig. 13 where the extension 159 rests in a recessed portion of the dog 152. As the register is moved into engagement with the racks the extension 159 cams the dogs 152 to the position of Fig. 21 which moves the tail 156 out of line with the pin 157 so that as the link 147 moves to the right it moves on its pin and slot connection with the arm 148 to the position of Fig. 22. This does not cause any movement of the arm 148 and no tendency for the restoring bail to move to restoring position. Accordingly the carry segments are not restored and the detents 130 are not released but held firmly in position so as to act as stops for the register pinions without any danger of them being moved.

In addition operations the link 147 moves to the right before the register is rocked into engagement with the racks and consequently, as the register is rocked into engagement with the racks, the extension 159 does not cam the dog 152 and the connection between the link 147 and the arm 148 is not broken.

Although transfers take place in the upper registering mechanism by an extra step of movement of the actuator racks, which racks also operate the lower registers, this extra step is not communicated to the lower registers. The normal position of the lower registers is out of engagement with the racks while the normal position of the upper registering mechanism is in engagement with the racks. At the end of the return stroke of the machine, the lower registers are rocked out of engagement with the racks and this occurs before the extra step of movement of the racks. At the time this occurs the racks are moving very slowly, if at all, owing to the fact that the actuating cam for returning the restoring bail for the racks has a dwell on it which acts near the end of the return stroke, said cam and its dwell being clearly illustrated in Fig. 13 below the bail 617.

No claim is made herein to the transfer mechanism or to the controls therefor as the same has been made the subject matter of copending applications.

Non-add upper registering mechanism

The upper registering mechanism may be placed in a non-add position by depression of a key and also automatically by the carriage, but the mechanism will be more easily understood by first describing the key control.

A non-add key 170 is provided at the left side of the keyboard and its stem has a stud 171 (Fig. 1) midway its length that engages a lever 172 pivoted toward the front of the machine to the substraction lever 30. This lever has a tail piece at its extreme left end engaging over a stud 173 on a lever 174 pivoted at the rear of the machine and provided with a downwardly and forwardly extending arm 175 having a curved portion extending over a projecting lip or lug 176 on the link 28. When the non-add key is depressed the link 28 is moved downwardly out of the path of the stud 26 on the oscillating arm 813 so that the stud 26 does not engage the shoulder 27 as the machine reaches the end of its forward stroke and the upper registering mechanism is not rocked into engagement with the actuator racks. Since the registering mechanism was moved out of engagement with the racks at the beginning of the forward stroke and is not moved into engagement with them owing to depression of the non-add key the movement of the racks has no effect on the registering mechanism and the item will not be entered in it.

The lever 174 that is moved downward by depression of the non-add key also has a forward extending projection engaging over a stud 177 on the pivoted member 69. When the non-add key is depressed, the member 69 is rocked counter clockwise to a position such that it prevents the passby pawl 821 from engaging the stud on the three-armed lever 913, and thus prevents the registering mechanism being moved into engagement with the racks by the pitman 914.

Non-add for lower registers

The lower registers may also be non-added, both by means of a key and automatically by the carriage.

A lower register non-add key 180 is positioned at the left side of the keyboard (Fig. 1), and provided with a long irregular shaped stem ending in a finger piece 181 adjacent a stud 182 on the upper arm 183 of the three-armed lever pivoted at 184. The downwardly extending arm 185 of this lever is connected by a pin and slot connection to a link 186 whose opposite end carries an inwardly extending stud 187 (Figs. 2ᵃ and 7). Bearing against the under side of this stud is one arm 188 of a yoke whose other arm 195 extends forwardly in position to contact a long stud carried by the passby pawl 86 so that when the yoke is moved clockwise, the passby pawl is positioned out of the path of the cam surfaces of the actuating cams and no rocking action of the register frame can take place. The yoke is rocked clockwise by means of an elbow lever 192 (Fig. 7) having one arm engaging the top side of the stud 187 on the link 186 and the other arm 193 cam shaped to cooperate with a cam roller 194 on the oscillating plate 813. Under normal conditions the stud 187 is to the right of the position shown in Fig. 7 and out from between the arms 192 and 188. The arm 193 is out of the path of the roller stud 194 under these conditions and no non-add action takes place. In the first non-add position of the parts the stud 187 is moved to the Fig. 7 position between the arms 188 and 192. This places the arm 193 in the path of roller stud 194 and upon oscillation of plate 813 during operation of the machine, the arm 193 is moved clockwise to rock the yoke having the arms 188 and 195 clockwise to move the pawl 86 out of the path of the actuating cams.

The link 186 with its stud 187 has a second non-add position to the left of that shown in Fig. 7 in which position the stud 187 remains between the arms 188 and 192 and the non-add action is as before described.

There is also a third position for link 186 further to the left in which the stud 187 occupies a recess 192ª in the arm 192. This permits the arm 192 to move downwardly to move the arm 193 out of the path of stud 194. Accordingly, in this position the lower counter is not non-added.

The non-add key 180 moves the link 186 and stud 187 to the first of the above described positions, the other positions being used in connection with the carriage control hereinafter described.

An interlock is provided between the non-add key and the control lever 104 (Fig. 1) to prevent one from being operated when the other is operated. The details of this interlock are not illustrated in the present case, but are fully described in my co-pending application.

*Automatic carriage control of non-add for either or both the upper and lower registers*

Either the upper registering mechanism or any one of the selected lower registers, or both, may be automatically non-added by the paper carriage.

For this purpose the carriage is provided with rollers or tappets which engage the arm 200 (Fig. 1) of a yoke whose other arm extends inwardly and is twisted and extends forward with its forward end astride a pin or stud 201 (Fig. 2) of one of the arms 203 of the three-armed lever pivoted at 184. Rollers of different diameters may be provided on the carriage for causing different degrees of movement of the three-armed lever, and the non-adding of one or the other or both of the sets of registers is determined by the extent of movement of this three-armed lever.

To automatically place only the lower register in non-add position, a roller of small diameter is employed which gives the three-armed lever just sufficient movement to move the link 186 to cause a non-adding of the lower register and without causing the stud 182 on the upper arm of the lever to exert a camming action on the raised portion 204 on the lever 175 (see Fig. 7).

To automatically place both the upper and lower registers in non-add condition, a larger diameter roller is employed which moves the three-armed lever further clockwise and to a position such that the stud 182 acts on the raised portion 204 to move the lever 175 downwardly to non-add the upper registering mechanism. The link 186 is moved slightly further during this operation to its second position but continues to maintain the lower register in non-add position.

To automatically place only the upper registering mechanism in non-add condition, a still larger roller is employed which moves the three-armed lever still further in a clockwise direction. This causes the stud 182 to continue to cam the lever 175 downwardly to non-add the upper registering mechanism, but the further movement of the link 186 results in disabling the non-add mechanism for the lower registers so that the lower registers are in addition condition.

From this it will be evident that by employing rollers on the carriage of different diameters and locating them in any desired sequence, either or both sets of registers may be non-added in any desired columnar position.

*Use of main total or sub-total keys for totaling or sub-totaling on lower registers*

When the total key in a Burroughs machine is depressed, the actuating racks are released for movement in the well-known manner. The extent of their descending movement is determined by the amount in the registering mechanism which is brought into engagement with the racks prior to their descent and which is rotated to "0" by their descent. When taking a total on any one of the lower registers which cooperate with the same racks, it is necessary to have the racks descend but there should be no change in the controls for the upper registering mechanism. Accordingly, means have been provided under the control of the lower register control lever 104 for disabling the control of the upper registering mechanism by the total key, while at the same time permitting the use of this key to release the racks for taking a total or sub-total on the lower registers.

Figure 24:
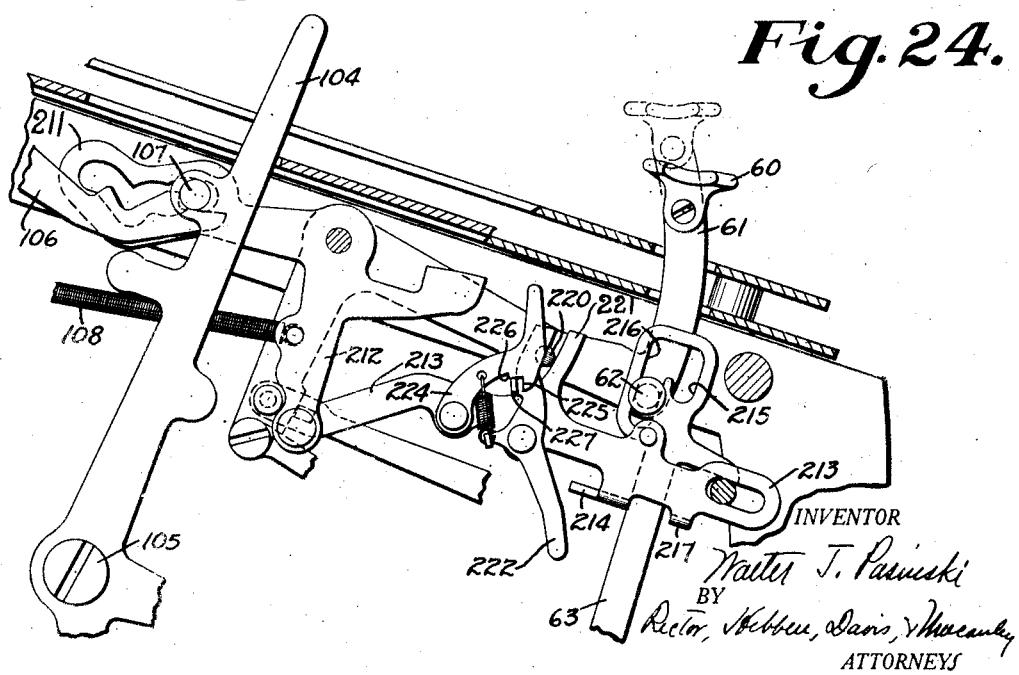
Fig. 24 is a view corresponding to Fig. 23 showing the position of the parts when the total key is depressed.
Figure 25:
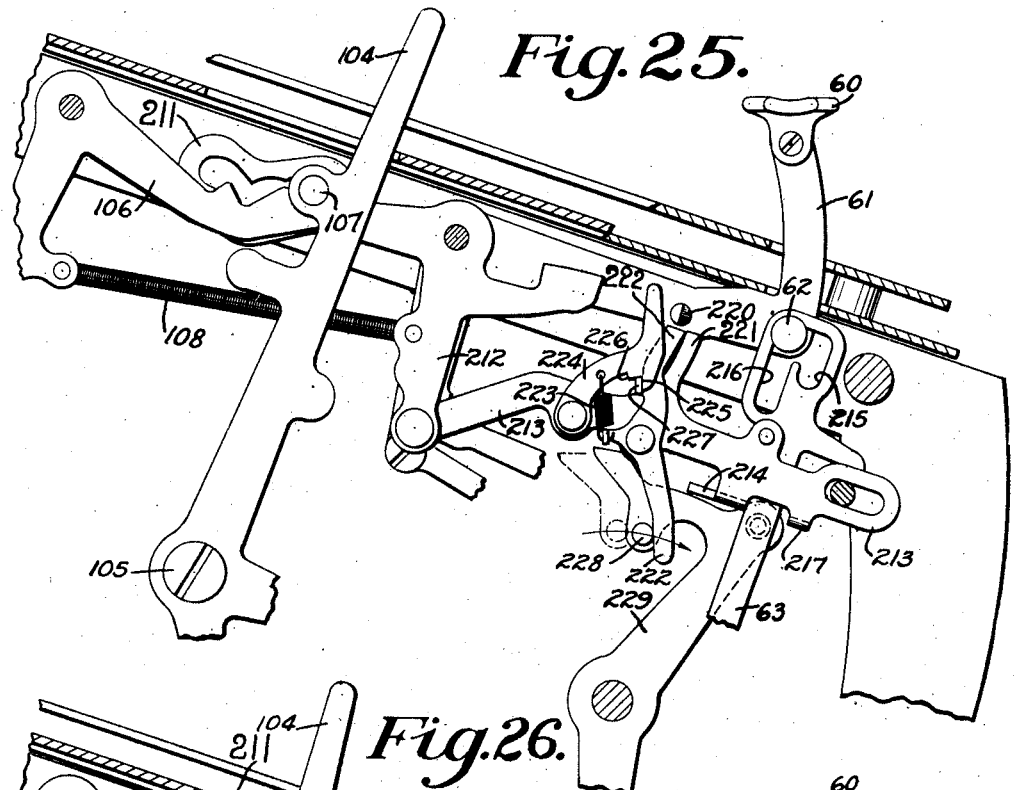
Fig. 25 is a view corresponding to Figs. 23 and 24 showing the position of the parts after the total key has been released and after the control lever has again been moved to total position.
Figure 26:
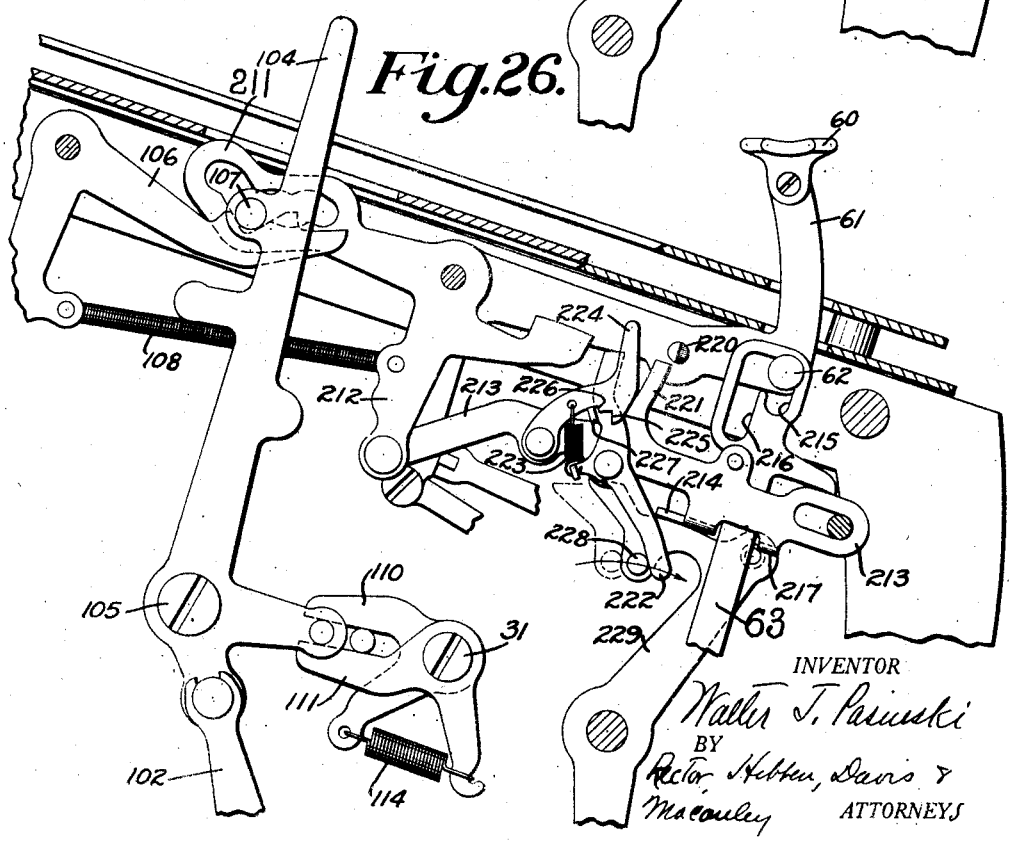
Fig. 26 is a view corresponding to Fig. 25 with the control lever moved back to normal position.

The lower register control lever 104 carries a stud 107 (Figs. 23, 24 and 25) operating in a slot in the arm 211 of a bell crank lever having a downwardly extending arm 212 connected to a link 213 having a laterally extending projection 214 which engages the rear side of the link 63, connecting the total key with the pitman 914. Ordinarily the stud 62 on the total key bell crank lever operates in a short slot 215 in the link 63 so that, when the total key is depressed, the link is pushed downward. When the lower register control lever 104 is moved either forward to total position or backward to sub-total position, the bell crank lever 211—212 is rocked counter-clockwise which thrusts the link 213 forward and pushes the link 63 forward so that the stud 62 operates in a long slot 216 in the link 63, and depression of the total key has no effect in pushing the link downward. Accordingly, the total key may be utilized for releasing the racks, but it does not control the upper registering mechanism connections.

In this manner the same total key may be used for taking a total from both the upper and the lower registers. When a total is taken from the upper registering mechanism, the key operates in the familiar manner. When a total is taken from a lower register, the control lever 104 is moved to total position and the total key depressed in the usual manner which releases the racks but does not affect the upper registering mechanism.

The same action occurs in the taking of a sub-total since the sub-total and the total keys in a Burroughs machine both act on the link 63, and both release the racks. In taking a sub-total on any one of the selected lower registers in the present machine, depression of the sub-total key after the lower register control lever 104 has been placed in sub-total position, simply releases the actuating racks without affecting the upper registering mechanism. Either the total or sub-total keys may be used interchangeably for taking a total or sub-total from the lower registers, as the control for determining whether a total or sub-total is to be taken is determined by the control lever 104.

The link 213 which moves the link 63 also has a lateral projection 217, extending in front of the link 63 so that when the control lever 104 is moved to its central position, the link 63 is moved back to normal to place the upper registering mechanism under the control of the total key.

*Lock for preventing successive depressions of the total key when the lower register controls are in position for taking a total or sub-total*

An operator may desire to successively take totals from the different lower registers. This would call for successive depressions of the total key and a shifting of the registers to selected positions. It is desirable to insure that a spacing stroke will be taken before the total key 60 is depressed a second time while the control lever 104 is in position to take a total or sub-total on one of the lower registers. As previously explained, the lower registers cannot be shifted lengthwise when the control lever 104 is in its total or sub-total position because the locking dog 245 (Figs. 1 and 2ª) remains in locked position under these conditions. Accordingly, if the total key were depressed a second time there could be no shifting of the registers lengthwise to another selected position as might be called for under the setting of the stepped bar on the carriage. By locking the total key against depression a second time it is necessary to take a spacing stroke, which is taken without the total key depressed and which must be taken with the control lever 104 in central position, and this results in the shifting of the registers if the carriage is set for such action. Then, after the shifting of the registers, the total key can be again depressed to take a total from the next selected register.

The total key bell crank lever 61, which may be moved downwardly by both the total and the sub-total keys, carries a stud 220 (Fig. 23) which may be moved downwardly on either side of a projection 221 carried by the link 213. Pivoted to the link 213 is a locking dog 222 which is normally urged clockwise by a spring 223 which also is connected to a detent or latch 224, having two shoulders 225 and 226 both of which may be engaged by a lateral lug 227 on the locking dog 222.

Figure 23:
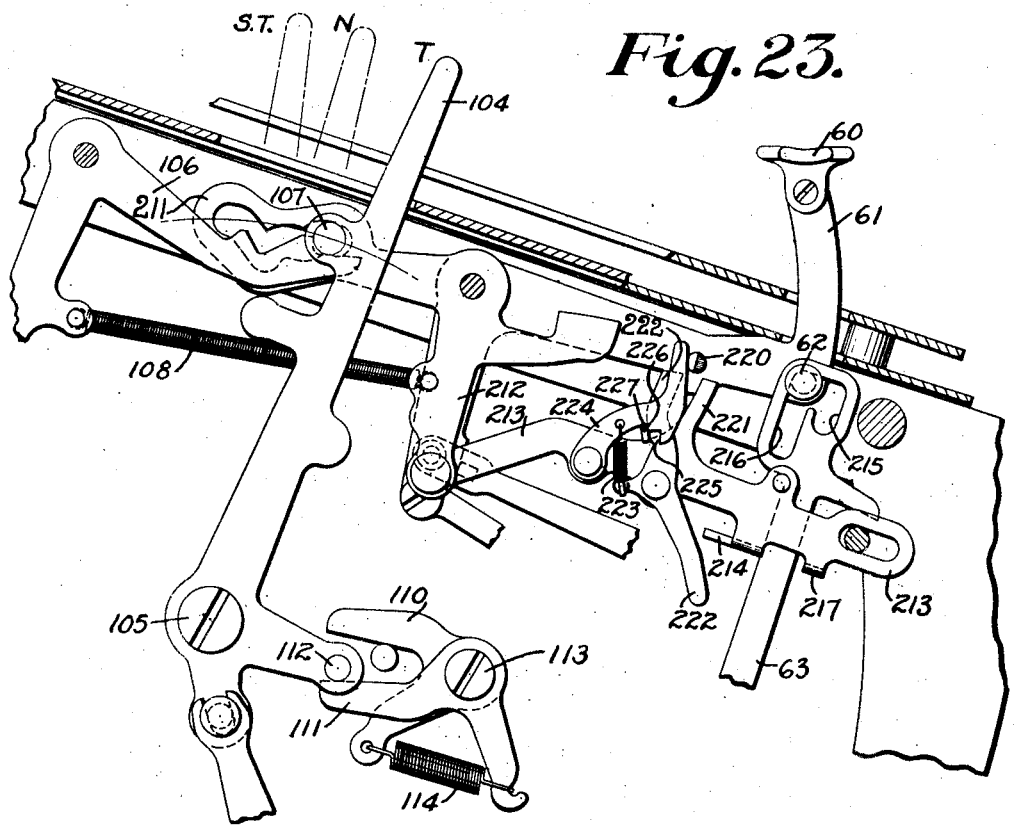
Fig. 23 is a side elevation showing the interlocking connections between the upper register total key and the control lever for the lower registers, the control lever being in total position and the total key undepressed.

The normal position of the parts when the control lever 104 is in total position and prior to depression of the total key 60, is illustrated in Fig. 23. The lug 227 is in engagement with the first shoulder 226 and the upper end of dog 222 is out of the path of stud 220. With the parts in this position the total key 60 may be depressed to the position of Fig. 24 during which movement the pin 220 moves down between the projection 221 and the locking dog 222. The stud 220 engages the latch 224 and rocks it counter clockwise to the position of Fig. 24, which permits the dog 222 to rock slightly clockwise against the pin 220 to position the lug 227 against the second shoulder 225. When the total key is then released, the dog 222 moves to the position of Fig. 25 under the influence of spring 223, in which position the end of the locking dog 222 is under the stud 220 thereby preventing a second depression of the total key 60. This condition prevails as long as the control lever 104 remains in total position, or, if it has been moved to sub-total position, the same condition exists as long as the lever remains in sub-total position.

When the lever 104 is moved to its central position from either its total or sub-total positions, the link 213 is moved rearwardly and this carries the locking dog 222 rearwardly. The projection 221 is also moved rearwardly past the stud 220, and the total key is then free to be depressed at which time it will control the taking of a total on the upper registering mechanism, but not on the lower.

The locking dog 222 is returned to normal position by a stud 228 (Fig. 25) carried by a projection 229 on one of the arms carrying the restoring bail which normally restores the carrying pawls in a Burroughs machine. This action occurs during a spacing stroke of the machine. It does not occur as long as the control lever 104 is in its total or subtotal position, because at that time the link 213 is sufficiently far forward to position the locking dog 222 beyond the path of the stud 228.

*Selective control of multiple registers*

Figure 8:
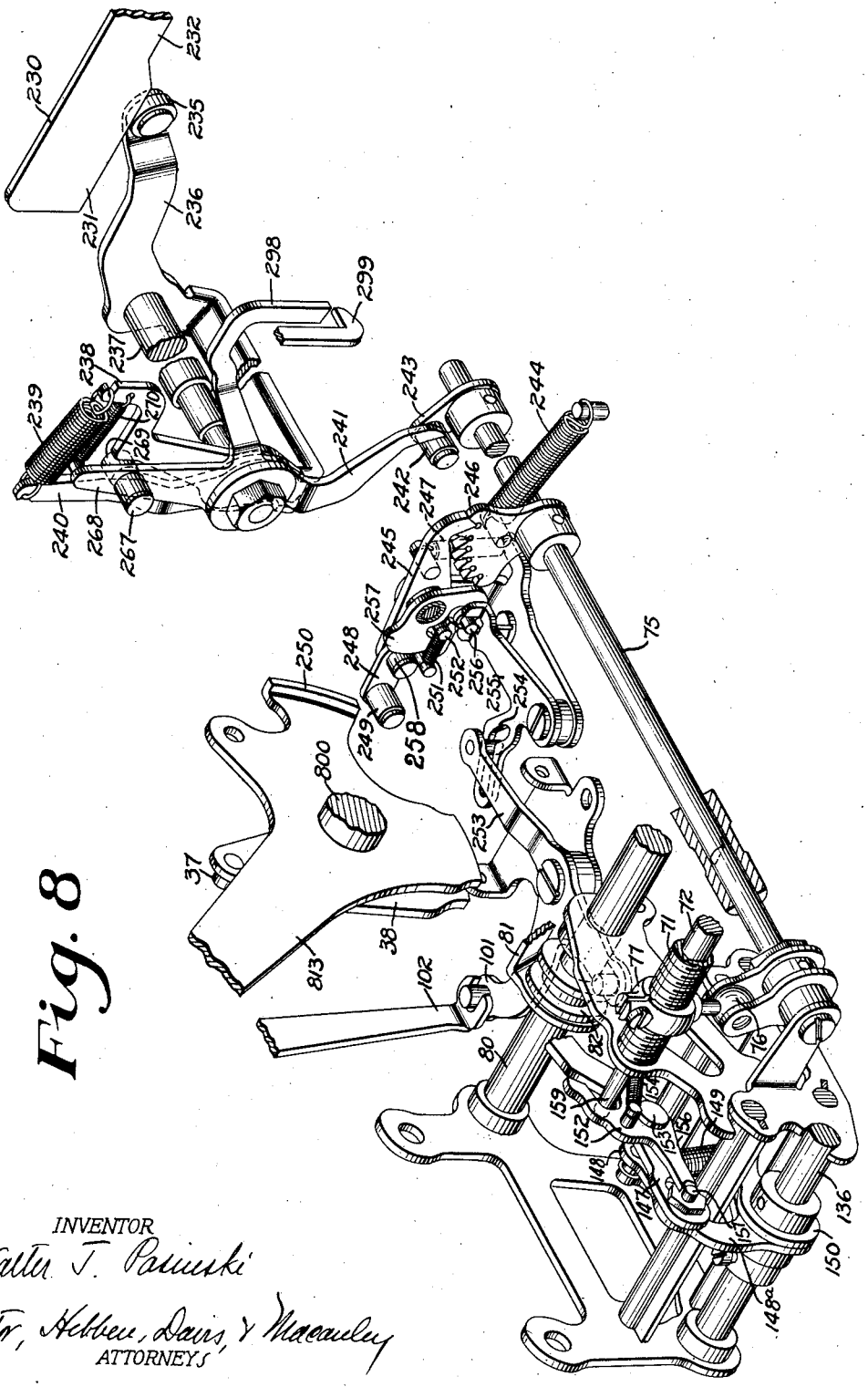
Fig. 8 is a perspective view of the controlling mechanism for shifting the multiple registers lengthwise to selectively position one of them for active cooperation with the actuator racks.
Figure 9:
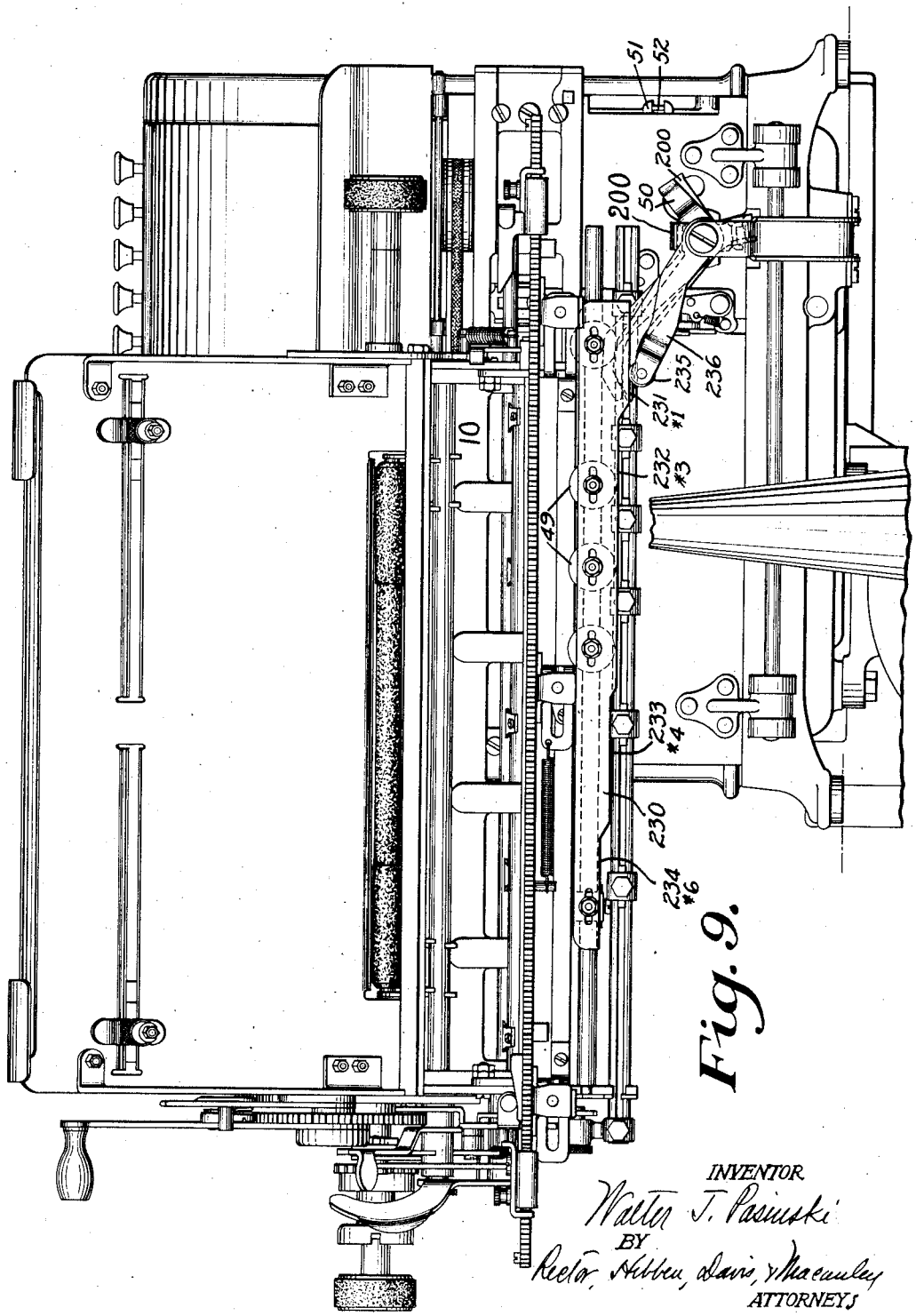
Fig. 9 is a rear elevation illustrating the carriage control of the register selecting mechanism.

As previously stated, any one of the six multiple registers may be moved to active position in alignment with the actuator racks by moving the sleeve 71 (Fig. 2ᵃ) longitudinally on the shaft 72 through the rocking action of the shaft 75. This shaft can be controlled manually but, in the construction shown, it is automatically controlled by the paper carriage in the following manner:

The paper carriage has a stepped bar 230 adjustably secured to it as illustrated in Figs. 1 and 9. This bar in the present machine has four steps marked respectively "231, 232, 233, and 234." Urged against the lower edge of this bar is a roller 235 carried by the arm 236 (Fig. 8) of a yoke shaped member pivoted to a shaft 237 and provided with a second arm 238 that extends upwardly and receives one end of a spring 239. The other end of this spring is connected to an arm 240 also pivoted on the shaft 237. The latter arm has a lower extension 241 positioned so as to engage a roller stud 242 carried by an arm 243 fixed to the rock shaft 75. The rock shaft is normally urged in a clockwise direction, as viewed in Fig. 8, by means of a spring 244 which thus urges the shaft in a direction to move the registers longitudinally from left to right and to maintain the roller stud 235 in engagement with the lower edge of the stepped bar 230. The degree of movement of the rock shaft 75 under the influence of the spring 244 is determined by the extent of movement permitted by the bar 230 and by having different stepped portions on this slide in different columnar positions of the carriage, the desired one of the lower registers may be automatically selected. The sequence of selection depends upon the arrangement of the cam surfaces on the cam bar 30. In Fig. 9, these cam surfaces are uniformly stepped from one end of the bar to the other which causes the registers to be selected in uniform order from number one to number six. In Fig. 30, an irregular arrangement of surfaces is shown which results in selecting the registers in an irregular order. It is to be understood that any arrangement of cam surfaces desired can be employed.

The register shaft may be moved in either direction to select any register but the action of the parts is slightly different when the registers are shifted from right to left.

If the carriage has positioned the register so that one of the left hand registers is active, for example, No. 6, and if it is then desired to shift back to any of the other registers, a lower portion on the stepped bar is employed. When shifting from a high to a low portion the arm 236 is forcibly rocked downward or clockwise as viewed in Fig. 8, in which event it expands the spring 239 because the lever 240 is blocked by contact of its lower portion 241 with the cam roller 242 carried by the shaft 75 which is locked as hereinafter described. Upon the beginning of the next forward stroke the shaft is unlocked at which time the spring 239 immediately acts to move the arm 240 to rock the shaft 75 counter-clockwise against the tension of spring 244 which is weaker than the spring 239. In this way the registers are moved from the No. 6 toward the No. 1 position.

The rock shaft 75 is normally locked against movement by means of a dog 245 which engages teeth in the edge of a sector 246 fixed to the rock shaft. The dog is normally urged to locking position by a spring 247 (Fig. 11) connected at one end to the dog and at its other end to a fixed part of the machine. Pivoted to the rear of the locking dog is a passby pawl 248 carrying a roller stud 249 which, under certain conditions, is positioned in the path of a laterally projecting edge of a sector 250 on the oscillating lever 813 which first moves clockwise and then counter-clockwise as viewed in Fig. 8. The passby pawl 248 is urged counter-clockwise by a spring 251 which tends to hold the pawl against a stud 252 on the locking dog. Under normal conditions, the sector 250 moves downwardly at each stroke of the machine from the position shown in Fig. 8 and contacts the roller 249 to cam the locking dog 245 to the unlocked position shown in Fig. 11. This releases the rock shaft 75 during the major portion of the forward stroke of the machine thereby permitting the proper one of the lower registers to be positioned, after which the sector 250 passes the roller 249 at the end of the forward stroke, and permits the locking dog 245 to be snapped into position by the spring 247 to lock the rock shaft 75 and through it, the selected register in the position to which it has been moved. During the return stroke of the machine, the sector 250 simply raises the passby pawl 248 against the tension of the spring 251 without unlocking the dog.

Figure 11:
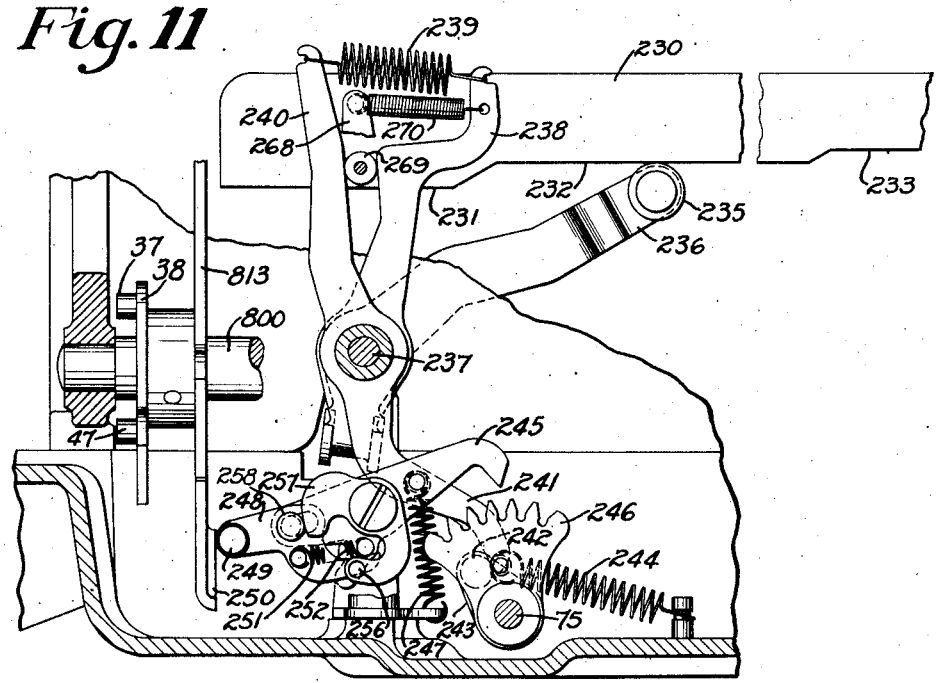
Fig. 11 is a partial section looking toward the rear and showing the locking mechanism for the selective register control unlocked.

During the taking of a total or sub-total on the selected register, it is not desired to unlock the rock shaft 75 when the machine is given its total or sub-total stroke of operation, and accordingly provision is made for disabling the movement of the locking dog 245 by the sector 250 when the control lever 104 for the lower register is moved to total or sub-total position. The bell crank lever 101, which shifts the yoke 81 in the taking of a total or subtotal on the lower registers, has a rear extension 253 carrying a stud operating in a slot in one arm 254 of a bell crank lever whose other arm 255 has an upturned forked end which straddles a stud 256 on a cam plate 257 whose edge engages a roller stud 258 on the passby pawl 248. The pivot connection of the passby pawl to the locking dog 245 has a limited pin and slot movement as illustrated in Figs. 11 and 12 and, normally, the cam plate 257 maintains the pivot at the outer edge of the slot in the position shown in Fig. 11, thereby maintaining the roller stud 249 in the path of the sector 250. When the control lever 104 is in its central position, the parts are in the position illustrated in Fig. 8. If the lever is moved to its total position, the rear arm 253 of the lever 101 is moved to the full lined position shown in Fig. 12. If the control lever 104 is moved to sub-total position, the lever 253 is moved to the dot and dash figure shown in Fig. 12. Both of these movements rock the bell crank lever 254—255 clockwise which rotates the cam plate 257 counter clockwise from the position of Fig. 8 and releases the stud 258 to permit the passby pawl 248 to be pulled back by the spring 251 to the rear of the pin and slot connection. This pulls the roller stud 249 out of the path of the sector 250 as illustrated in Fig. 12. Accordingly, when the machine is given a stroke of operation, the rocking of the sector 250 has no effect on the locking dog 245 which remains in position to lock the shaft 75 during the entire operation of the machine in taking a total. This prevents any accidental displacement of the selected register from its position in alignment with the actuator racks.

*Listing negative totals in special registers*

In the form of machine illustrated, provision is made for positioning four of the lower registers by means of the stepped bar 230. These are registers 1, 3, 4 and 6. The other two registers, namely 2 and 5, are reserved for accumulating negative totals. The registers reserved may be varied to suit the requirements, but, in the present case, the second and fifth registers are used because these are adjacent the first and sixth registers respectively and, in banking work, the first register can be conveniently used for printing "old balances," while the last or sixth register prints the "new balances". In other words, totaling operations take place in the first and sixth registers and it is convenient to accumulate negative totals in the registers next to them.

Figure 14:
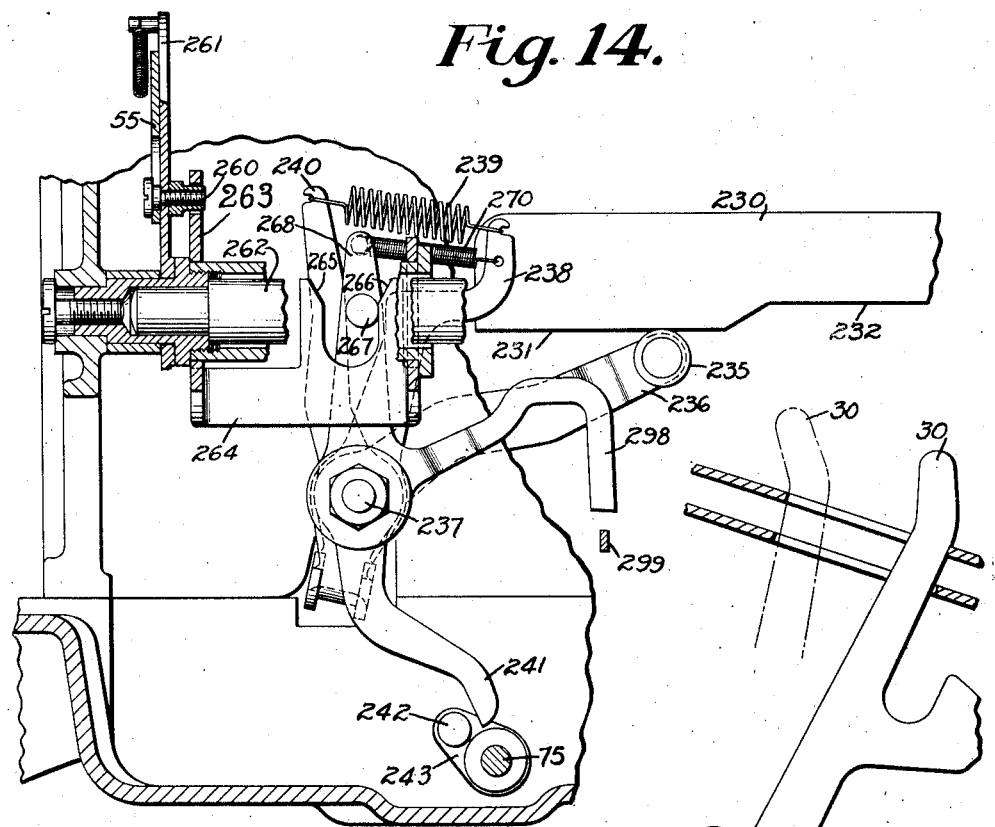
Fig. 14 is a partial section looking to the rear illustrating the control of the selective register control by the subtraction lever when a negative total is taken.
Figure 15:
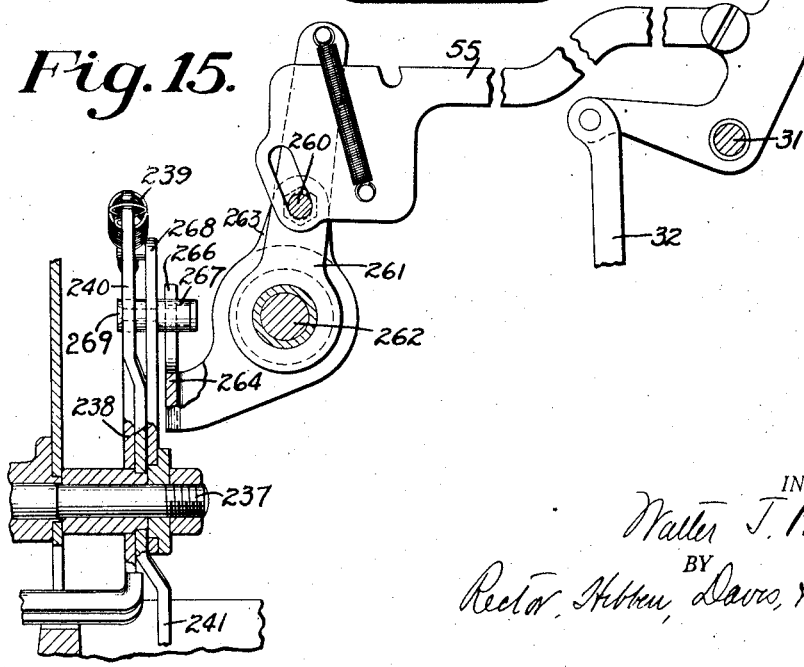
Fig. 15 is a side elevation and section illustrating the control of the selection of the registers by the subtraction lever when taking a negative total, the parts being in position for operation.

When a negative total is taken, it is necessary to have the subtraction controls in subtraction position. The link 55 which is connected to the subtraction lever 30 has a widened rear portion (Figs. 13 and 15) provided with a cam slot in which a stud 260 operates. This stud is carried by an arm 261 pivoted on the shaft 262. The stud 260 projects on both sides of the arm 261 (Fig. 14) and extends into an opening in one arm 263 of a yoke 264 pivoted to rock about the shaft 262. This yoke has an upwardly extended bifurcated portion having two cam surfaces 265 and 266 which, under certain conditions, operate on a stud 267 carried by a lever 268 pivoted on the shaft 237. A stud 269 extends on the opposite side of the lever 268 between the arms 238 and 240 as best shown in Fig. 8. A spring 270 normally maintains the stud 269 in engagement with the edge of the arm 238.

Figure 10:
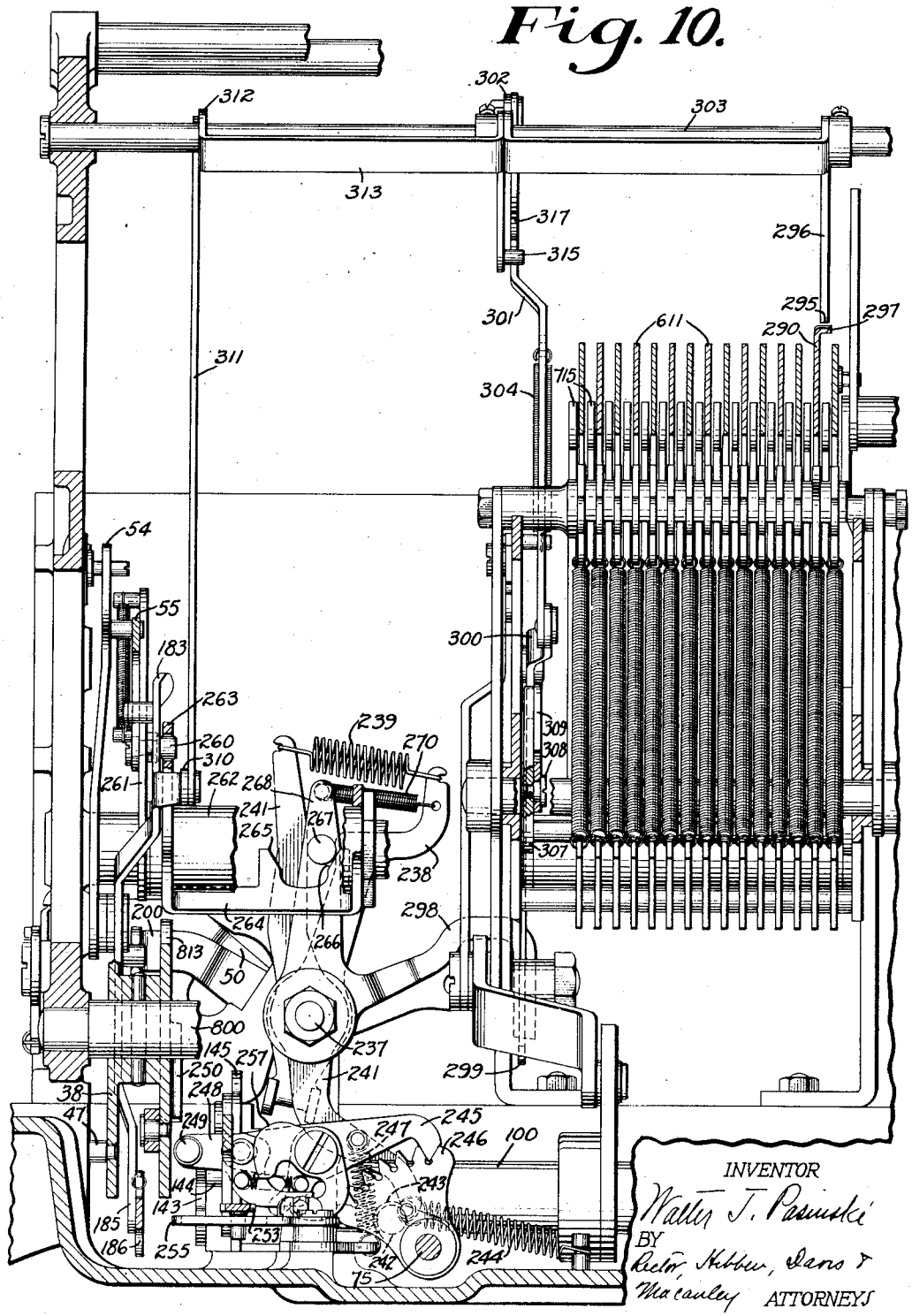
Fig. 10 is a vertical section of a portion of the machine looking toward the rear and illustrating particularly the controls for selecting the registers including the subtraction lever control.

When the machine is conditioned for addition, the parts are in the position illustrated in Figs. 1 and 13, in which case the yoke 264 is in its lowered position where it is not engaged by the roller stud 267. When the subtraction lever 30 is moved to subtraction position to permit the taking of a negative total on the upper register the yoke 264 is rocked up to the position illustrated in Figs. 14 and 15 where its bifurcated end straddles the stud 267. If the carriage is in either its "column 3" or "column 4" position, this has no effect on the selective register control because the stud 267 is in the space between the cams 265 and 266 and no camming action takes place. If, however, the carriage is in its "column 1" or its "column 6" position, the stud is contacted by the cam surfaces 265 or 266. The "column 1" position is illustrated in Fig. 10 where the parts are in the position they occupy just prior to the throwing of the subtraction lever 30 to subtraction position. When the subtraction lever is moved, the cam 266 strikes the stud 267 and moves the arm 268 to the position illustrated in Fig. 14 which rocks the arm 240 against the tension of the spring 270 to permit the shaft 75 to be moved by the spring 244 to shift the second register into alignment with the actuator racks so that, when a negative total is taken from the upper registering mechanism, which negative total is the true negative total, it will be accumulated in the No. 2 register instead of the No. 1 register although the carriage is in its No. 1 position. The necessary spacing strokes must be given the machine during the taking of the total but this does not disturb the position of the selected register as it remains locked in position as previously explained.

The same action takes place when the carriage is in the column 6 position except that in such event the cam surface 265 is active instead of the cam surface 266 and the registers are shifted to accumulate the negative total in the No. 5 register instead of the No. 6 register.

Key control of special accumulation of negative totals

A key control for the cam yoke 264 is illustrated in Fig. 28. In this construction a "withdraw" key, which is depressed to withdraw or subtract an item, controls the yoke 264 to list negative totals in special columns.

The "withdraw" key 280 overlaps the touch bar 281 so that depression of the key also depresses the touch bar to start the machine. This key, when depressed, moves an arm 282 downwardly and rocks the shaft 283 clockwise. This shaft carries a second arm 284 contacting a stud on a link 285 connected to one end of a pivoted lever 286 whose other end contacts a stud on the link 32 connected to the subtraction lever 30. The connection of the link 32 to lever 30 is a pin and slot connection in this form of control so as to permit the link 32 to be moved upwardly by link 286 without moving the subtraction lever 30.

The shaft 283 carries a third arm 287 connected by a link 288 with the yoke 264. Accordingly, when the key 280 is depressed the yoke 264 is rocked upwardly to cam the arm 268 to the right or left depending upon the position it happens to occupy at the time. If the "withdraw" key is depressed when the lever 268 is in any of its intermediate positions heretofore explained, said lever is not moved and the only result is to condition the machine for subtraction and cause an operation of the machine to subtract an amount from the upper registering mechanism and add it in the lower register which happens to then be in active position. If, however, the arm 268 is in either of its positions corresponding to the "column 1" or the "column 6" position, depression of the key 280 shifts the arm 268 to cause the amounts entered on the amount keys to be added to the No. 2 or No. 5 lower registers at the same time it is subtracted from the upper registering mechanism.

Special character printing

The totals, sub-totals, non-add and subtract operations are indicated by special characters as explained in White No. 1,018,285. In addition it is desirable to indicate in which of the lower registers the various operations, including addition, have taken place so that the operator can easily tell from the printed record in which register each operation has taken place.

For this purpose an extra printing segment 290 (Fig. 27) is employed carrying a series of types 291 containing numbers corresponding to the different registers. This segment is normally urged in a clockwise direction as viewed in Fig. 27 by a spring 292 but it is normally prevented from so moving by a lug 293 on an arm 294 fixed to the shaft 600 which is oscillated with every operation of the machine. It is also prevented from moving by the lowest step 295 of a stepped segment 296 which engages a projecting lug 297 on the printing segment. When the operations are in the upper registering mechanism, the stepped segment 296 is not moved and the printing segment 290 is blocked against movement by the shoulder 295 even though the lug 293 moves away from the printing segment.

The stepped segment 296 has a series of shoulders 1, 2, 3, 4, 5 and 6 for positioning the printing segment in appropriate positions to position the proper type to print a number corresponding to the lower register that is being used. This segment is positioned in the following manner:

The arm 268 (Fig. 8) which follows the arm 238 under the action of spring 270 has an extension 298 which engages the shouldered end of a link 299 pivoted to one end of a lever 300 (Fig. 27) to whose other end is connected a link 301 that in turn is pivoted to one arm 302 of a yoke loosely mounted on the shaft 303 and whose other arm is the segment 296.

The connections above described are normally urged downward and the member 299 upward by a spring 304 which causes the link 299 to follow the member 298 in its movements which are responsive to the selection of registers. The extension 298 actuates the linkage mechanism above described to position the segment 296 to stop the character printing segment in position to print the number corresponding to the selected register.

The stepped segment 296 is returned to its normal position by connections operated by the shaft 800. Fixed to this shaft is a plate 305 to which is connected a link 306 pivoted to an arm 307 carrying a stud 308 operating in a cam slot in a link 309 pivoted to an extension of the link 300. The shaft 800 is rocked counter-clockwise during the forward stroke of the machine and clockwise during the return stroke as viewed in Fig. 27. During the forward stroke the stud 308 moves counter clockwise which permits the lever 300 to rock clockwise. The member 309 follows the stud 308 and upon the return stroke the stud 308 acts upon the end of the slot in the link 309 and rocks the lever 300 counter-clockwise to thrust the link 301 upwardly against the tension of the spring 304 thereby rocking the segment 296 to normal position. During the return stroke the lug 293 engages a member 290$^a$ on the printing segment to also return it to normal position.

It is not desired to print a special character when any selected register of the lower registers is non-added and, accordingly, connections are provided which are controlled by the non-add mechanism so as to block the character printing mechanism against movement. The lever 183 which controls the non-add has an extension 310 to which is pivoted a link 311 connected to one arm 312 of a yoke 313 whose other arm 314 carries a stud 315 normally operating in a slot 316 in a widened portion of the link 301. When the machine is being operated to perform addition in the lower registers the stud 315 is in line with the slot 316 and the link 301 may move freely up and down. If, however, the arm 183 is moved to one of its non-add positions for the lower registers, the link 311 is pulled downwardly, which rocks the yoke 313 counter-clockwise and positions the stud 315 under the end of a branch 317 of the link 301. The link 301 is thus blocked against downward movement and the stud 308 merely moves in the slot in the arm 309. The arm 300 and link 301 are prevented from following the stud because the link 301 is blocked by the stud 315 and this effectually holds the stepped segment 296 in position to block the printing segment 290 against movement.

Example of work

An example of work that can be performed on the machine in connection with customers' accounts in banking is illustrated in Fig. 29.

A ledger sheet for customer A is inserted in the machine and his old balance of $600.00 is entered in the left-hand column. This balance goes into the upper registering mechanism and it is simultaneously entered in the #1 lower register. A character is printed indicating that it has been accumulated in the #1 lower register. The carriage then automatically tabulates to the next position.

The date is then entered and a check for $300.00 is subtracted. This is subtracted from the $600.00 in the upper registering mechanism and, at the same time, it is entered in the #3 lower register and a character printed to indicate that fact.

The carriage then automatically tabulates to the next two "check" positions where, in the example illustrated, checks for $200.00 and $100.00 respectively are subtracted from the upper registering mechanism and are added in the #3 lower register. The machine then automatically tabulates to the "deposit" column.

The date is automatically repeated in the deposit column and a deposit of $500.00 is entered which is added in the upper registering mechanism and is simultaneously accumulated in the #4 lower register and a character printed indicating that fact. The machine next tabulates to the "new balance" position.

The date is again repeated and a total is taken from the upper registering mechanism which is then cleared. This total or "new balance" is simultaneously entered in the #6 lower register and two characters are printed indicating that a total was taken from the upper registering mechanism and that it was accumulated in the #6 lower register. This operation is repeated for the different customers, B, C, D, etc., a new ledger sheet being inserted for each customer.

In the case of customer D the total amount of the checks subtracted is more than the "old balance" plus the deposit, and a negative total results. Accordingly, when the operator attempts to depress the total key in the "new balance" position, he will find it locked and it will then be necessary to move the subtraction lever to subtraction position, said locking of the total key being accomplished by a negative total locking mechanism which is well known on Burroughs machines. If he moves the lever to subtraction position he may then take a negative total or "overdraft" directly which will be the true negative total and which will be automatically indicated as a negative total by the special character "OD". At the same time this negative total will be automatically accumulated in the #5 lower register instead of in #6.

In the case of customer E, his ledger sheet shows an over draft of $170.00 from the preceding checking of his account. This overdraft is entered in the "old balance" position the same as before but with the upper registering mechanism in subtract position, such fact being indicated by the printing of a "minus" sign opposite the entry. In order to thus enter this balance, the operator has had to move the subtraction lever to subtract position and, when the machine is operated, this causes the "negative old balance" to be automatically accumulated in the #2 lower register instead of in #1 as is the case for positive old balances. The number of this register is also printed opposite the entry. The operations are then repeated as before until all the accounts have been entered.

The machine is then operated to enter items on the bank's general ledger sheet BL. The carriage is moved to the "old balance" position where the automatic tabulating feature is disabled. A total is then taken from the #1 lower register to show the total of the "positive old balances" which have been accumulating in this counter. This total, in the example illustrated, is $2,500.00. A special character indicates that a total has been taken from one of the lower registers and the number of the register is indicated by another special character. At the time this total is taken, it is automatically added in the upper registering mechanism.

A total is then taken of the "negative old balances" in the #2 lower counter by moving the subtraction lever to subtraction position and taking a total which is simultaneously subtracted from the upper registering mechanism at the time the lower #2 register is cleared. This total, in the present example is $170.00 and this total of the "negative old balances" is printed with one special character to indicate that the total is of negative items and another to indicate the number of the register from which it was taken.

The difference between the total "positive old balances" and the total "negative old balances", $2,330.00, may then be obtained by taking a sub-total from the upper registering mechanism which is printed with an appropriate character S to indicate that a sub-total has been taken. This leaves the difference in the upper registering mechanism.

The machine is next moved to the third "check" position where a total is taken from the #3 lower register to show the total of the checks and appropriate special character marks are printed. This total, which is $2,850.00, is simultaneously subtracted from the amount in the upper registering mechanism.

The carriage is next moved to the "deposit" position where a total is taken from the #4 lower register to show the total of the deposits, $2,373.00. This is simultaneously added in the upper registering mechanism and the machine is then operated to take a total from the upper registering mechanism. In the example given, this total is $1,853.00 which represents the total "positive old balances", less the total "negative old balances", less the total checks, plus the total deposits.

The machine is next tabulated to the "new balance" position where a total is taken from the #6 lower register to show the total of the "positive new balances", amounting to $1,983.00, the same being indicated as a total from #6 lower register by appropriate characters. This total is simultaneously entered in the upper registering mechanism.

The machine is then operated to take a total of the "negative new balances" from the #5 lower register. This is done by moving the subtraction lever to subtraction position and depressing the total key. This total amounts to $130.00 and is indicated by proper characters. At the same time, it is subtracted from the upper registering mechanism.

The machine is then operated to take a total from the upper registering mechanism which shows the difference between the "positive new balances" and the "negative new balances" which is $1,853.00. This is the same as the amount obtained in the "deposit" column and checks the work.

In this manner the operator is enabled to obtain the total of the positive old balances of all customers, the total of the negative old balances, the difference between the two, the total of the checks, the total of the deposits, the total of the "positive new balances", the total of the "negative new balances", the difference between the positive and negative new balances, and at the same time, he may check the work. He thus obtains complete information on the condition of the account.

It is to be understood that many variations in the sequence of the operations and in the relations between the registers can be made. The large number of registers any one of which may be selected, together with the fact that either the upper or the lower set or both may be non-added and that the upper registering mechanism may be placed in addition as well as in subtraction condition, permits a wide range of choice in the character of operations to be performed. By properly constructing the stepped bar on the carriage the registers can be selected in the desired sequence and all the operations performed automatically. The machine may be used for many other different lines of work than banking. In fact, its field is so large that it is useless to attempt to enumerate the different kinds of work that can be performed.

The structure shown is for purposes of illustration only and variations may be made in it without departing from the spirit and scope of the invention as defined by the claims.

I claim:

1. The combination in an accounting machine of manipulative amount determining devices, differential mechanism, means for conditioning the machine to take a true negative total, a plurality of registers selectively movable to position to cooperate with the different mechanism, means for selecting said registers in a certain order in the normal operation of the machine, and means under the control of said negative-total-conditioning means for causing a special register to be automatically selected when the machine is operated to take a negative total.

2. The combination in an accounting machine of manipulative amount determining devices, differential mechanism, an addition-subtraction registering mechanism, means for conditioning the machine to yield either a positive or a true negative total from said registering mechanism, a set of multiple registers selectively movable to position to cooperate with said differential mechanism, means for normally selecting the registers of said multiple set in a certain order, and means controlled by said conditioning means for said first-named registering mechanism for automatically selecting a special register of said multiple set to receive a negative total when the machine is operated to take a negative total from said first registering mechanism.

3. In an accounting machine, a registering mechanism in which items may be added or subtracted, a traveling paper carriage, means for conditioning said machine for the taking of either positive or true negative totals from said registering mechanism, a plurality of multiple registers selectively controlled by said carriage to receive items that are added, subtracted, or totaled in said registering mechanism; and means operating automatically when a negative total is taken from said registering mechanism to select one of said multiple registers for receiving said negative total other than the register selected by the carriage in the position it occupies when said negative total is taken.

4. In an accounting machine having a paper carriage movable to different columnar positions, the combination of a plurality of registers selectively movable to position to receive items, means controlled by said paper carriage for selecting said registers, and means acting automatically when the paper carriage is in certain columnar positions for causing negative items to be entered in registers other than those selected by the carriage when in said positions.

5. In an accounting machine having manipulative amount determining devices, differential mechanism including actuator racks, a registering mechanism cooperating with said racks, and means for conditioning the machine to take a true negative total from said registering mechanism, the combination of a plurality of registers selectively movable into position to be moved into and out of engagement with said racks, a paper carriage having controlling connections to automatically select said registers, and means controlled by said means for conditioning the machine for taking a negative total from said registering mechanism for causing said negative total to be entered in a selected register other than the register selected by the carriage in the position it occupies when the machine is operated to take the negative total.

6. In an accounting machine having manipulative amount determining devices, differential mechanism including actuator racks, a registering mechanism movable into and out of engagement with said racks, and a subtraction lever for conditioning said machine for subtraction and for taking a true negative total from said registering mechanism; the combination of a plurality of registers selectively movable to position to be moved into and out of engagement with said racks, a paper carriage having controlling connections for selecting said registers, and means operated by said subtraction lever when moved to subtraction position for selecting a predetermined register for cooperation with the racks other than the one normally selected by the carriage.

7. In an accounting machine, the combination of manipulative amount determining devices, differential mechanism including actuator racks, a paper carriage movable to different columnar positions, an upper registering mechanism, operating means for rocking said registering mechanism into and out of engagement with said racks to perform addition, means for conditioning the operating means to rock said registering mechanism into and out of engagement with the racks to perform subtraction, a plurality of lower registers comprising interspersed pinions mounted upon a common longitudinally movable support, means under the control of said carriage for automatically positioning said support to selectively position different sets of pinions in alignment with said actuator racks, means for rocking the selected set of pinions into and out of engagement with said actuator racks, and means under the control of said means for conditioning the operating means for the upper registering mechanism to perform subtraction for selecting special ones of said lower registers in certain positions of the carriage.

8. In an accounting machine having manipulative amount determining devices and differential mechanism including actuator racks, the combination of a series of registers selectively movable into position to be moved into and out of engagement with said racks, a printing mechanism including a printing segment with connections for positioning the segment to print a character indicating which of the registers has been selected, a non-add mechanism for preventing addition in said registers, and means operated by said non-add mechanism for blocking the printing segment against movement when the non-add mechanism is operated to prevent addition in the registers.

9. In an accounting machine having manipulative amount determining devices and differential mechanism including actuator racks, the combination of a plurality of registers mounted upon a common longitudinally movable support, a transversely movable paper carriage, connections controlled by the carriage for positioning the support to selectively position different registers for cooperation with the actuator racks, said connections including a special member, controlling devices for said member for operating it to select a register in certain columnar positions of the carriage other than the one normally selected by the carriage in said position, and a character printing mechanism controlled by said special member to print a character for each of the selected registers to indicate which register has been selected.

10. In an accounting machine, the combination of a plurality of registers selectively movable into position to be moved into and out of engagement with actuator racks, locking means for normally preventing selective movement of said registers, means for normally unlocking said locking means at each operation of the machine, actuating means for moving the selected register into and out of engagement with the actuator racks, controlling means for conditioning said actuating means to take a total, and means positioned by said controlling means for disabling the means for unlocking the locking means whenever said controlling means is conditioned for the taking of a total.

11. In an accounting machine having manipulative amount determining devices, and differential mechanism including actuator racks, the combination of a series of registers selectively movable into position to be moved into and out of engagement with said actuator racks, a paper carriage for automatically selecting said registers, actuating means for moving the selected register into and out of engagement with the racks, total taking means for conditioning the actuating means for taking a total from the selected register, means for locking the register selecting means when the total taking means is in position for taking a total, and means for preventing the total taking means from being given successive operations until the machine has been operated to unlock the register selecting means.

12. In an accounting machine, the combination of manipulative amount determining devices, differential mechanism including actuator racks, a registering mechanism movable into and out of engagement with said racks, a total key and connection for controlling said registering mechanism, a second register, actuating means for moving said second register into and out of engagement with the racks, a controlling lever for conditioning said actuating means to take a total or a subtotal from said second register by depressing the total key for the first registering mechanism, and means for preventing the total key from being depressed successively when the controlling lever for the second register is in total or subtotal position.

13. A calculating machine having actuator racks, a paper carriage movable longitudinally across said machine in two directions, a plurality of registers comprising pinions mounted on a support movable longitudinally in two directions to selectively position the registers relative to the actuator racks, and means controlled by said paper carriage in its movements across the machine in one direction acting to selectively move said register support in either of its longitudinally movable directions.

14. In an accounting machine, the combination of manipulative amount determining devices, differential mechanism including actuator racks, a series of three or more registers comprising pinions rotatably mounted upon a common longitudinally movable shaft, a traveling paper carriage, means controlled by said carriage for automatically moving said register shaft both forward and backward longitudinally to selectively position any one of the registers for cooperation with the actuator racks, and means for moving the selected register into and out of engagement with the racks.

15. In an accounting machine having manipulative amount determining devices and differential mechanism including actuator racks; the combination of a plurality of registers mounted upon a common longtiudinally movable support, means for urging the support longitudinally in one direction, means normally locking said support against movement back and forth longitudinally, means for unlocking the locking means at each operation of the machine, a traveling paper carriage, and connections controlled by said carriage for variably determining the amount of movement of the support under the influence of its urging means, said connections also including means actuated by the carriage for moving the support against the influence of its urging means to selectively position the registers for operation, and means for moving the selected register into and out of engagement with the racks.

16. In an accounting machine, the combination of manipulative amount determining devices, differential mechanism including actuator racks, a series of three or more registers comprising pinions mounted on a common longitudinally movable support, means urging the support in one direction, a paper carriage mounted for movement back and forth across the machine, and connections controlled by said paper carriage when moving in one direction for controlling the movement of the support under the influence of its urging means to selectively position any of said series of registers relative to said actuator racks, said connections including means actuated by the paper carriage when it moves in the opposite direction for moving the support against the influence of its urging means to selectively position any of the registers for operation, and means for moving the selected register into and out of engagement with the actuator racks.

17. In an accounting machine, the combination of manipulative amount determining devices, differential mechanism, a traveling paper carriage movable to different columnar positions, a plurality of registers comprising pinions rotatably mounted on a common longitudinally movable support, means controlled by the paper carriage for automatically moving said register support longitudinally to select the registers in any order in different columnar positions of the carriage for cooperation with the differential mechanism, and means for moving the selected register into and out of engagement with the differential mechanism.

18. In an accounting machine having manipulative amount determining devices and differential mechanism including actuator racks, the combination of a series of registers mounted on a common shaft movable longitudinally to position selected registers in alignment with the actuator racks for movement into and out of engagement with said racks, means for locking said shaft against movement, means for unlocking said locking means at each operation of the machine, and devices controlled by the paper carriage for automatically moving said shaft when it is unlocked to select which of said registers shall be positioned to be moved into and out of engagement with the rack.

19. In an accounting machine having manipulative amount determining devices and differential mechanism including actuator racks, the combination of a series of registers mounted on a common shaft movable longitudinally to selectively position the registers adjacent the actuator racks for active operation, means for normally locking said shaft against movement, means operated with each stroke of the machine for unlocking said locking means, means urging said shaft in one direction, devices controlled by a paper carriage for determining the extent of movement of said shaft under the action of said urging means, said devices including yielding means, which, when the devices are actuated by the carriage to move the shaft in a direction opposite to the action of the urging means, are placed under tension so that, when the shaft is unlocked, the yielding means overcomes the urging means to move the shaft against the action of the urging means.

20. In an accounting machine, the combination of manipulative amount determining devices, differential mechanism including actuator racks, a traveling paper carriage movable to different columnar positions, a plurality of registers comprising pinions rotatably mounted on a common longitudinally movable support, means for urging said support in one direction, a locking means for normally locking the support against movement, means for unlocking said locking device at each operation of the machine, means controlled by the paper carriage for determining the movement of the support to thereby selectively position different registers for cooperation with the actuator racks, and means for moving the selected register into and out of engagement with the racks.

21. The combination in an accounting machine of spaced actuator racks positioned near the front of the machine, a register support mounted to move transversely in front of said actuator racks, a plurality of registers on said support, the pinions of the same order of each register being grouped together and positioned between adjacent actuator racks so that different registers may be selected for operation by a small movement of said register support, an operating shaft connected to said register support and extending toward the rear of the machine, spring means tending to rock said shaft in one direction, a locking means normally holding said operating shaft against movement, connections operated by said machine at each operation thereof to unlock said locking means, a paper carriage on the rear of the machine having a cam bar, and connections between said cam bar and said operating shaft for controlling the movement of said shaft and for moving it against the tension of its spring means to thereby selectively position the register support in different positions in both directions longitudinally.

22. A calculating machine having a paper carriage movable back and forth across the machine, three or more registers carried by a support movable to three or more positions to selectively position each register for calculations, said support being movable in either direction from an intermediate position to the next selected position, and means controlled by said paper carriage in its movement in one direction across the machine acting to automatically move said register support in either direction to thereby move said support directly from any one position to the next selected position.

23. An accounting machine having a forward and return stroke of operation, a traveling paper carriage, means for moving said carriage from one column to another during the latter part of the return stroke of operation of said machine, a set of multiple registers selectively movable to active position, register selecting means, locking means normally holding said registers in selected position, indexing means controlled by said carriage for automatically indexing said selecting means during the return stroke of a given machine operation, and means for momentarily unlocking said selecting means during the forward stroke of the next machine operation whereby the selected register may be automatically moved to selected position under the control of the indexing means as set during the preceding machine operation.

24. A calculating machine having a forward and return stroke of movement, a traveling paper carriage automatically moved from one column to another during the return stroke of movement of said machine, a plurality of registers carried by a support which is movable to selectively position the registers for operation, locking means normally locking said support against movement, means controlled by said paper carriage during its movement from one column to another during the return stroke of movement of a given machine operation for placing a tension on said register support tending to move it, means acting during the forward stroke of the next machine operation to momentarily release said locking means to enable said register support to move under the influence of the tension placed upon it, and means controlled by said paper carriage for determining the extent of movement of said register support.

25. An accounting machine having manipulative amount determining devices, differential mechanism, an addition-subtraction registering mechanism, means for conditioning said machine to take either a positive or a true negative total from said registering mechanism, a set of multiple registers selectively movable to a position to cooperate with said differential mechanism, means for selecting said registers, means acting automatically, when said machine is operated to take a true negative total, to select for the receipt of said total a special one of said multiple registers assigned to receive negative totals only, and means operating automatically during said negative total taking operation to enter said true negative total additively in said specially selected register.

26. An accounting machine having manipulative amount determining devices, differential mechanism, an addition-subtraction registering mechanism, means for conditioning said machine to take either a positive or a true negative total from said registering mechanism, a set of multiple registers selectively movable to position to cooperate with said differential mechanism, means for selecting said registers, means controlled by said negative-total-conditioning means acting automatically when a negative total is taken from said first mentioned registering mechanism, to select for the receipt of said total a special one of said registers assigned to receive negative totals only, and means operating automatically during the taking of said negative total to cause said true negative total to be entered additively in said specially selected register.

27. An accounting machine having manipulative amount determining devices, differential mechanism, a traveling paper carriage, an addition-subtraction registering mechanism, means for conditioning said machine to take either a positive or a true negative total from said registering mechanism, a set of multiple registers selectively movable to position to cooperate with said differential mechanism, means for selecting said registers, means controlled by said negative-total-conditioning means in a predetermined columnar position of said carriage when a negative total is taken from said registering mechanism for automatically selecting for the receipt of said total a special one of said registers assigned to receive negative totals only, and means acting automatically when said machine is operated to take said negative total to enter said true negative total additively in said special register.

28. An accounting machine having manipulative amount determining devices, differential mechanism, an addition-subtraction registering mechanism, means for conditioning said machine to take either a positive or a true negative total from said registering mechanism, a set of multiple registers selectively movable to a position to cooperate with said differential mechanism, means for normally selecting said registers in a certain order, means acting automatically during operation of said machine in the taking of a negative total for automatically selecting a special one of said registers other than the one normally selected, and means operating automatically during the taking of said negative total to cause said total to be entered additively in said specially selected register.

29. An accounting machine having manipulative amount determining devices, differential devices, differential mechanism, a traveling paper carriage, an addition-subtraction registering mechanism, means for conditioning the machine for subtraction, a set of multiple-registers selectively movable to position to cooperate with said differential mechanism, means for selecting said registers, means controlled by said subtraction conditioning means and said paper carriage for causing a special one of said registers to be automatically selected when the machine is conditioned for subtraction in a predetermined columnar position of said carriage, and means acting automatically, when said machine is operated in said columnar position, to enter the subtraction item additively in said specially selected register.

30. An accounting machine having manipulative amount determining devices, differential mechanism, a traveling paper carriage, an addition-subtraction registering mechanism, a set of multiple registers selectively movable to a position to cooperate with said differential mechanism, carriage controlled means for normally selecting said special registers in a certain order, a withdrawal key and connections for conditioning said machine to cause a subtraction operation thereof and the simultaneous selection of a special one of said registers for the receipt of the subtracted item other than the one selected by said carriage, and means acting automatically when the machine is operated under said conditions to add said subtracted item in said specially selected register.

31. A calculating machine having a paper carriage movable back and forth across the machine, a multiple register support carrying three or more registers, said support being movable from a normal to any one of three or more selectable positions and being movable back and forth so that it can be moved from any selected position to any other of its selectable positions or returned to normal, and means controlled by said paper carriage during its travel from column to column across the machine in one direction acting to automatically move said register support backward or forward whereby said registers may be automatically selected in any predetermined sequence for the different columnar positions of said carriage as said carriage moves across said machine in said direction.

In testimony whereof, I have subscribed my name.

WALTER J. PASINSKI.

CERTIFICATE OF CORRECTION.

Patent No. 1,911,768.  May 30, 1933.

WALTER J. PASINSKI.

It is hereby certified that error appears in the printed specification of the above numbered patent requiring correction as follows: Page 16, line 101, claim 1, for "different" read "differential"; and that the said Letters Patent should be read with this correction therein that the same may conform to the record of the case in the Patent Office.

Signed and sealed this 25th day of July, A. D. 1933.

M. J. Moore.

(Seal)  Acting Commissioner of Patents.